United States Patent
Sekita et al.

(10) Patent No.: US 6,529,330 B1
(45) Date of Patent: Mar. 4, 2003

(54) OBSERVATION OPTICAL SYSTEM AND OPTICAL DEVICE HAVING THE SAME

(75) Inventors: Makoto Sekita; Takeshi Akiyama, both of Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 132 days.

(21) Appl. No.: 09/652,211

(22) Filed: Aug. 30, 2000

(30) Foreign Application Priority Data

| Sep. 1, 1999 | (JP) | 11-247153 |
| Sep. 1, 1999 | (JP) | 11-247154 |
| Sep. 30, 1999 | (JP) | 11-278638 |

(51) Int. Cl.⁷ .............................................. G02B 27/14
(52) U.S. Cl. ........................ 359/630; 359/631; 359/633
(58) Field of Search .............................. 359/630, 631, 359/632, 633, 727, 730

(56) References Cited

U.S. PATENT DOCUMENTS

| 2,780,142 A | 2/1957 | Bouwers ........................ 88/57 |
| 4,232,968 A | * 11/1980 | Kempf ......................... 356/393 |
| 4,991,942 A | 2/1991 | Fujibayashi et al. ........ 359/690 |
| 5,103,343 A | 4/1992 | Sekita ........................ 359/684 |
| 5,132,848 A | 7/1992 | Nishio et al. ............... 359/686 |
| 5,253,113 A | 10/1993 | Sekita et al. ................ 359/680 |
| 5,682,269 A | 10/1997 | Kimura et al. .............. 359/770 |
| 5,917,662 A | 6/1999 | Sekita ........................ 359/729 |
| 5,973,858 A | 10/1999 | Sekita ........................ 359/729 |
| 5,995,287 A | 11/1999 | Sekita ........................ 359/599 |
| 6,021,004 A | 2/2000 | Sekita et al. ................ 359/676 |
| 6,120,156 A | 9/2000 | Akiyama .................... 359/857 |
| 6,124,986 A | 9/2000 | Sekita et al. ................ 359/691 |
| 6,147,808 A | * 11/2000 | Togino ........................ 359/637 |
| 6,178,052 B1 | * 1/2001 | Aoki et al. .................. 359/730 |
| 2001/0048552 A1 | 12/2001 | Koyama et al. ............. 359/431 |

FOREIGN PATENT DOCUMENTS

| EP | 0 722 106 A2 | 7/1996 |
| EP | 0 722 106 A3 | 8/1996 |

* cited by examiner

*Primary Examiner*—Ricky Mack
(74) *Attorney, Agent, or Firm*—Fitzpatrick, Cella, Harper & Scinto

(57) ABSTRACT

An observation optical system includes an objective optical system for forming an inverted image of an object, an erecting optical system for converting the inverted image into an erected image and an eyepiece optical system for guiding the erected image to an observer. At least one of the objective optical system, the erecting optical system, and the eyepiece optical system has a first optical element having a curved reflecting surface and changes an observation magnification by changing relative positions of the first optical element and another optical unit.

19 Claims, 18 Drawing Sheets

OBSERVATION OPTICAL SYSTEM AND OPTICAL DEVICE HAVING THE SAME

BACKGROUND OF THE INVENTION

Field of the Invention

The present invention relates to a finder system and an optical device having the same and, more particularly, to a finder system suitable for an optical device such as a still camera, a video camera, or a digital camera which observes, with an eyepiece lens system, a finder image (object image) of a real image formed on a predetermined surface by an objective lens system at a variable magnification.

Related Background Art

In recent years, a real-image finder system capable of clearly observing the field frame (finder field frame) is widely used as the finder system of a camera such as a still camera or video camera in place of a virtual-image finder system of reverse-Galilean scheme.

Lens configurations of real-image finder systems are roughly classified into a primary imaging type system comprising an objective lens system, an erecting optical system for inverting the reverse image (inverted image) of an object, which is formed by the objective lens system, into an erected image using a prism such as a porro-prism or roof prism, and an eyepiece lens system disposed on the rear side of the erecting optical system to simultaneously observe the erected image and the field frame for limiting the observation range, and a secondary imaging type system using, in place of a prism as an erecting optical system, a secondary imaging system for re-imaging the reverse image of an object, which is formed by an objective lens system, to convert the reverse image into an erected image.

The finder magnification of a real-image finder system is generally defined as follows.

In a primary imaging type real-image finder system, letting fo be the focal length of the objective lens system, and fe be the focal length of the eyepiece lens system, a finder magnification γ1 is defined by $$\gamma 1 = fo/fe \tag{1}$$

In a secondary imaging type real-image finder system, letting fo be the focal length of the objective lens system, β be the magnification of the secondary imaging system, and fe be the focal length of the eyepiece lens system, the finder magnification γ2 is defined by $$\gamma 2 = \beta \cdot fo/fe \tag{2}$$

That is, the magnification of the secondary imaging type finder system is obtained by multiplying the magnification of the primary imaging type finder system by the magnification β of the secondary imaging system. Since the secondary imaging magnification β can be arbitrarily set, the secondary imaging type finder system can increase the degree of freedom in designing the finder magnification.

The type of real-image finder system is generally selected in accordance with the form of a camera. To decrease the thickness of a camera, the primary imaging type camera is used. To increase the thickness of a camera, the secondary imaging type is used.

In the primary imaging type, the extending direction of the finder optical system changes depending on the prism used, and various types of finders can be selected in accordance with the camera form and use form.

However, the positional relationship between the observation optical axis and the position of optical axis of incident light on the finder is determined by the type of prism used and cannot be freely changed.

Additionally, in terms of camera specifications, when the secondary imaging type finder having a high degree of freedom in designing the finder magnification is to be applied to a thin camera, the optical path of the finder must be appropriately bent using a planar mirror and the like, and the number of components tends to inevitably increase.

Recently, as image sensing lenses capable of zooming become popular, finder systems are also being equipped with a zooming function.

For zooming in a real-image finder system, (A) the magnification is changed in the objective lens system, (B) the magnification is changed in the eyepiece lens system, (C) the magnification is changed in the secondary imaging system, or (D) the magnification is changed by combining (A) to (C).

A real-image finder system has a high observation quality because it allows the user to more clearly see the field frame as compared to an virtual-image finder system, though the number of lens components tends to increase in principle.

The number of lens components increases especially when the finder system should have a zooming function.

To decrease the number of lenses in the conventional real-image finder system, an aspherical lens is used, or a prism and lens are combined.

However, the number of lenses can be only limitedly decreased using an aspherical lens. In addition, the composition of a prism and lens can only add a field lens function to the incident or exit surface of the prism.

Furthermore, in the finder system of a camera, the material of a lens in the finder system is often made of only acrylic or polycarbonate resin because of cost, moldability, and optical characteristics, and there is no degree of freedom in selecting the material. For this reason, various aberrations and particularly, chromatic aberration can hardly be corrected in a finder system having a zooming function.

SUMMARY OF THE INVENTION

It is an object of the present invention to provide a finder system suitable for a still camera or video camera, which allows a user to satisfactorily observe a finder image (object image) at various finder magnifications while simplifying the entire optical system using an appropriately set optical element in a finder system for allowing the user to observe an object image, and an optical device having the finder system.

In order to achieve the above object, according to the present invention, there is provided an observation optical system comprising an objective optical system for forming an inverted image of an object, an erecting optical system for converting the inverted image into an erected image, and an eyepiece optical system for guiding the erected image to an observer, wherein at least one of the objective optical system, the erecting optical system, and the eyepiece optical system has a first optical element having a curved reflecting surface and changes an observation magnification by changing the relative positions of the first optical element and another optical unit.

According to the present invention, there is also provided an optical device comprising the observation optical system of the present invention.

DETAILED DESCRIPTION OF THE PREFERRED EMBODIMENTS

Optical elements of a finder system of the present invention have tilted reflecting surfaces and have no axis of symmetry like an optical axis in a normal optical system. In the finder system of the present invention, a "reference axis" corresponding to the optical axis of a coaxial system is set, and the arrangement of elements in the optical system will be described on the basis of this reference axis.

The definition of the reference axis will be described first. Generally, the optical path of a certain light beam having a reference wavelength as a reference from an object surface to an imaging plane is defined as the "reference axis" in the optical system. Since a reference light beam cannot be determined by only this definition, normally, a reference axis light beam is set in accordance with one of the following two principles.

If the optical system even partially has an axis of symmetry, and the aberrations can be symmetrically adjusted, a light beam passing on the axis of symmetry is set as a reference axis light beam.

If the optical system has no axis of symmetry, or if the optical system partially has an axis of symmetry though the aberrations cannot be symmetrically adjusted, a light beam emerging from the object surface center (center of sensed or observed range) and passing through the optical system in the designated order of surfaces in the optical system and the aperture center in the optical system, or a light beam passing through the aperture center in the optical system and reaching the center of the final imaging plane is set as a reference axis light beam, and its optical path is defined as a reference axis.

The defined reference axis generally forms a bent line. The intersection between each surface and the reference axis light beam is defined as the reference point of each surface. The reference axis light beam on the object side of each surface is represented by an incident reference axis, and the reference axis light beam on the image side is represented by an exit reference axis.

The reference axis has a direction, in which the reference axis light beam propagates. An incident reference axis direction and exit reference axis direction are present on the incident and exit sides, respectively. The reference axis changes its direction in accordance with the rule of refraction or reflection in the set order of the surfaces and finally reaches the imaging plane.

In an optical element (optical system) having a plurality of surfaces, the reference axis light beam incident on the surface closest to the object side is represented by the incident reference axis of this optical element (optical system), and the reference axis light beam emerging from the surface closest to the image side is represented by the exit reference axis of this optical element (optical system). The definitions of directions of the incident and emerging reference axes are the same as for the surface.

Figure 18:
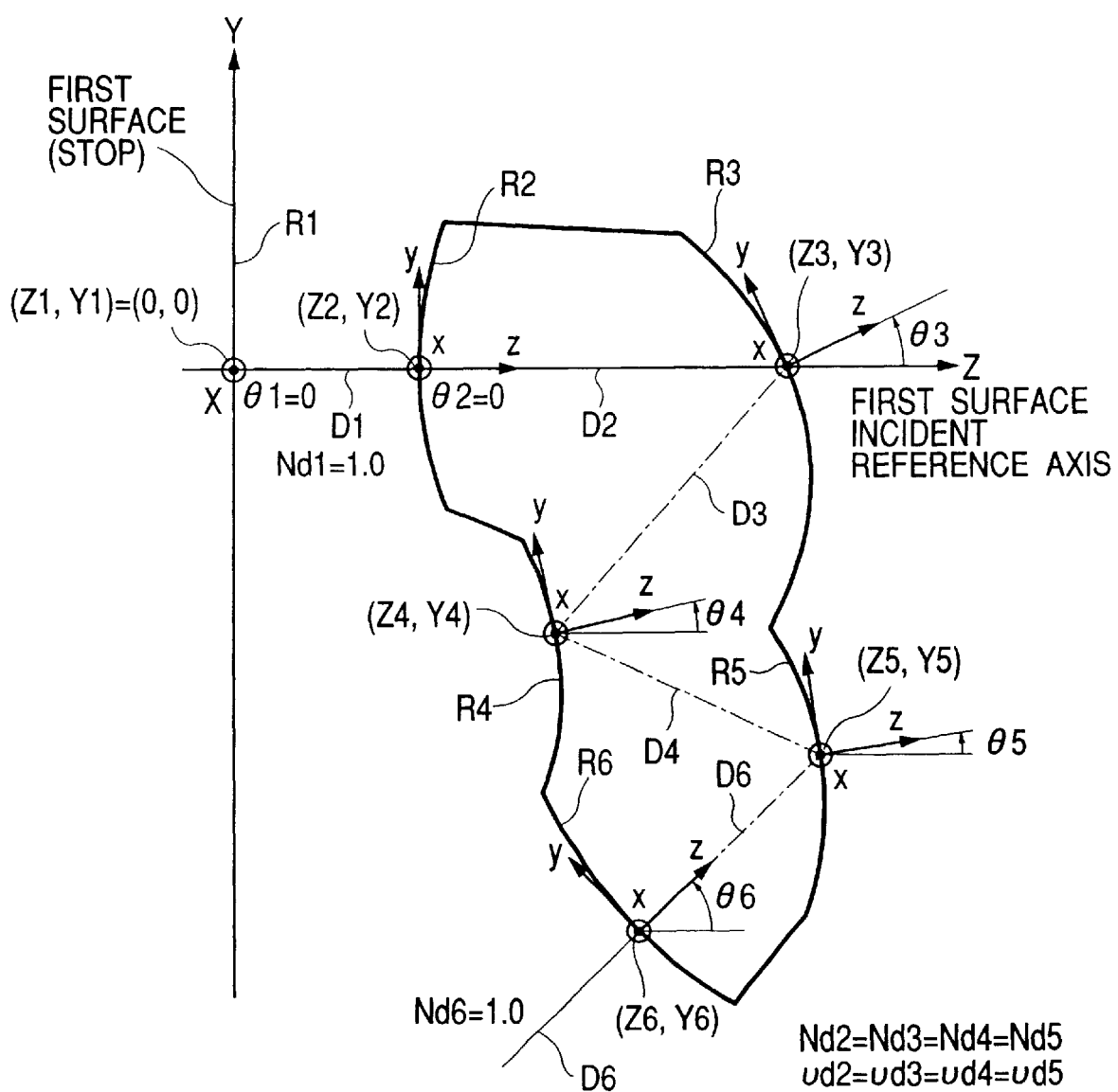
FIG. 18 is an explanatory view of the coordinate system of an optical element of this embodiment.

Before a description of the embodiments of the present invention, the way to expressing components of the optical system of each embodiment and the common matters of the embodiments will be described, FIG. 18 is an explanatory view of the coordinate system which defines constituent data of an optical system of the present invention. In the embodiments of the present invention, the ith surface along the reference axis light beam (indicated by the alternate long and short dashed line in FIG. 18) propagating from the object side is represented by the ith surface.

Referring to FIG. 18, a first surface R1 is an aperture, a second surface R2 is a refracting surface coaxial with the first surface, a third surface R3 is a reflecting surface tilted with respect to the second surface R2, a fourth surface R4 and fifth surface R5 are reflecting surfaces shifted and tilted with respect to the second and third surfaces, respectively, and a sixth surface R6 is a refracting surface shifted and tilted with respect to the fifth surface R5. The second surface R2 to the surface R6 are formed at part of a transparent body formed from a medium such as glass or a plastic, thereby forming one optical element, i.e., a first optical element B1 in FIG. 18.

Hence, in the arrangement shown in FIG. 18, air is used as a medium from an object surface (not shown) to the second surface R2, a certain common medium is used from the second surface R2 to the sixth surface R6, and air is used as a medium from the sixth surface R6 to a seventh surface R7 (not shown).

The optical system of the present invention is an eccentric optical system, and therefore, the surfaces forming the optical system have no common optical axis. In the embodiments of the present invention, the "absolute coordinate system of the optical system" is set, which has an origin at the center of the light beam effective diameter of the first surface. In the present invention, the axes of the absolute coordinate system of the optical system are defined as follows.

Z-axis: a reference axis directed to the second surface R2 through the origin,

Y-axis: a line passing through the origin and forming a counterclockwise angle of 90° with the Z-axis within the tilted surface (page surface of FIG. 18), and X-axis: a line passing through the origin and being perpendicular to the Z- and Y-axes (a line perpendicular to the page surface of FIG. 18).

As for the surface shape of the ith surface in the optical system, a local coordinate system having its origin at a reference point where the reference axis and the ith surface cross is set, and the shape of the surface is expressed on the local coordinate system. This allows easier recognition of the shape rather than expressing the surface shape on the absolute coordinate system of the optical system. Hence, in the numerical data of the embodiments of the present invention, the shape of the ith surface is expressed using the local coordinate system.

The tilt angle in the Y-Z plane of the ith surface is represented by an angle $\theta i$ (unit: °) that has a positive value counterclockwise with respect to the Z-axis of the absolute coordinate system of the optical system. Hence, in the embodiments of the present invention, the origin of local coordinates of each surface is present on the Y-Z plane in FIG. 18. No surface is tilted and shifted in the X-Z and X-Y planes. The y- and z-axes of local coordinates (x,y,z) of the ith surface are tilted by the angle $\theta i$ in the Y-Z plane with respect to the absolute coordinate system of the optical system. More specifically, the axes are set as follows.

z-axis: a line passing through the origin of the local coordinate system and forming the counterclockwise angle $\theta i$ with the Z-direction of the absolute coordinate system of the optical system in the Y-Z plane, y-axis: a line passing through the origin of the local coordinate system and forming a counterclockwise angle of 90° with the z-direction in the Y-Z plane.

x-axis: a line passing through the origin of the local coordinate system and being perpendicular to the Y-Z plane.

Additionally, Di is the scalar amount representing the interval between the origin of the local coordinate system of the ith surface and that of the (i+1)th surface, and Ndi and vi are the refractive index and Abbe's number of the medium between the ith surface and the (i+1)th surface.

Each optical element of the embodiments has a spherical surface, a rotationally symmetric aspherical surface, and an asymmetric aspherical surface. For the spherical surface portion, its spherical shape is represented using a radius of curvature $R_i$. The radius of curvature $R_i$ has a positive value when the center of curvature is in the + z-axis direction of the local coordinate system, and a negative value when the center of curvature is in the −z-axis direction.

A spherical surface has a shape represented by $$z = \frac{(x^2 + y^2)/R_i}{1 + \{1 - (x^2 + y^2)/R_i^2\}^{1/2}}$$

A rotationally symmetric aspherical surface has a shape represented by $$z = \frac{(x^2 + y^2)/R_i}{1 + \{1 - (1+k) \cdot (x^2 + y^2)/R_i^2\}^{1/2}} + a(x^2 + y^2)^2 + b(x^2 + y^2)^4$$

Each optical element of the embodiments has at least one asymmetric aspherical surface, and its shape is represented by $$z = C_{02}y^2 + C_{11}xy + C_{20}x^2 + C_{03}y^3 + C_{12}xy^2 + C_{21}x^2y + C_{30}x^3 + C_{04}y^4 + C_{13}xy^3 + C_{22}x^2y^2 + C_{31}x^3y + C_{40}x^4 + \ldots$$

For each asymmetric surface of the embodiments, only terms of even order related to x of the above surface expression are used, and 0 is substituted into terms of odd order, thereby obtaining a planar symmetric shape having only the y-z plane as a plane of symmetry.

When the following condition is satisfied, the surface has a symmetric shape with respect to the x-z plane.

$$C_{03} = C_{21} = 0$$

In addition, when $$C_{02} = C_{20}, C_{04} = C_{40} = C_{22}/2, C_{06} = C_{60} = C_{24}/3 = C_{42}/3$$

are satisfied, the surface has a rotationally symmetric shape. If none of the above conditions are satisfied, an asymmetric shape is obtained.

Figure 5:
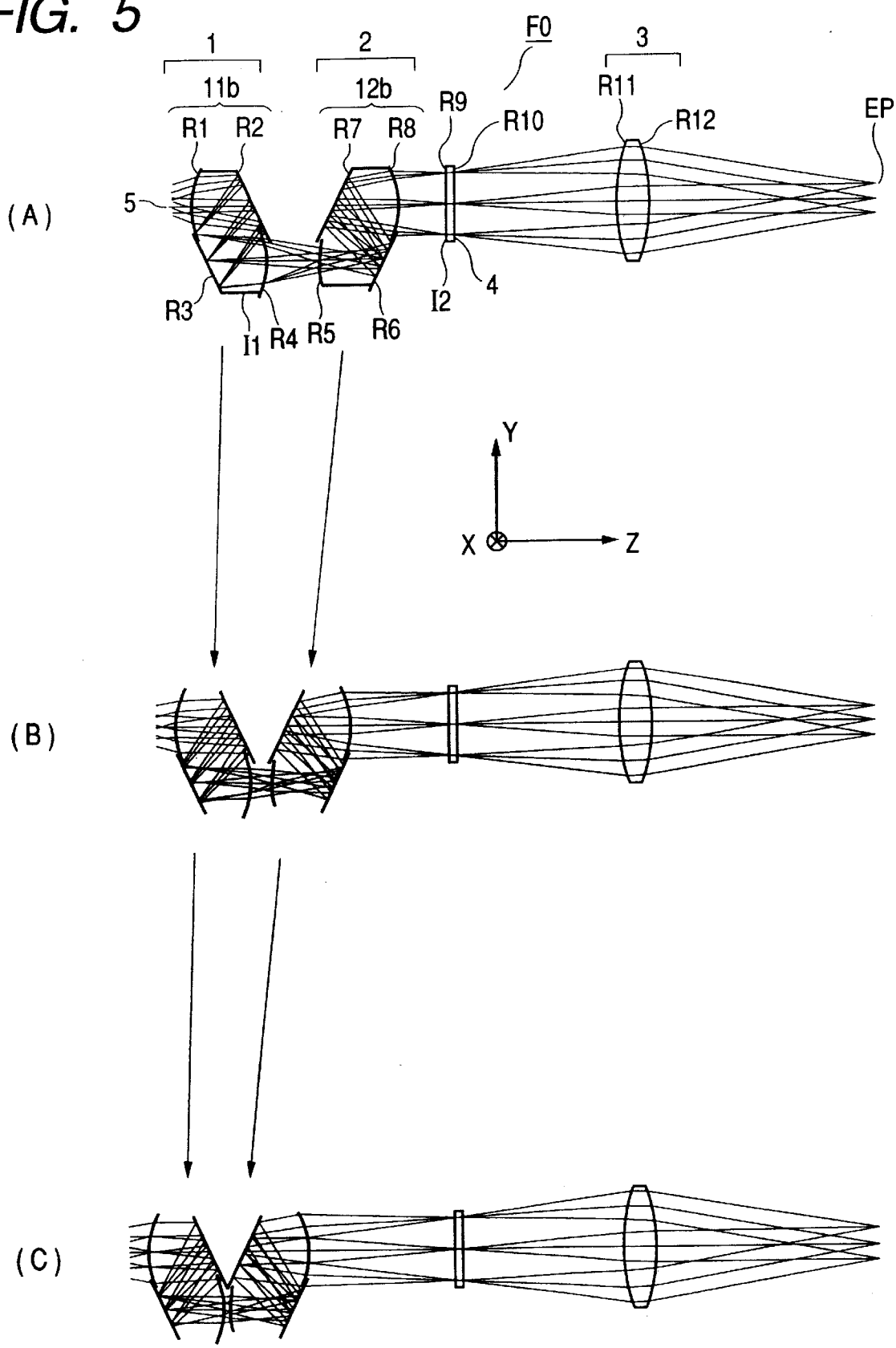
FIG. 5 shows sectional views of the main part of a finder system according to the second embodiment.

In numerical data, a horizontal half field angle $u_y$ refers to the half of the maximum field angle of a light beam incident on the first surface R1 in the Y-Z plane shown in FIG. 5, and a vertical half field angle $u_x$ refers to the half of the maximum field angle of a light beam incident on the first surface R1 in the X-Z plane.

The brightness of the finder system is represented using the opening at the eye point as a pupil diameter.

For embodiments with constituent data, lateral aberration charts are shown. The lateral aberration charts show lateral aberrations of light beams with incident angles, i.e., horizontal incident angles and vertical incident angles of $(u_x, u_y)$, $(u_x, 0)$, $(u_x, -u_y)$, $(0, u_y)$, $(0, 0)$, and $(0, -u_y)$. In the lateral aberration charts, the abscissa represents the incident height to the pupil, and the ordinate represents the aberration amount. In each of the embodiments, basically, each surface has a planar symmetric shape having the y-z surface as a plane of symmetry. For this reason, since each lateral aberration chart has the same aberration in the + and − directions of the vertical field angle, the lateral aberration charts in the − direction are omitted for illustrative convenience. The solid line in each aberration chart represents the aberration of the d line.

Figure 1:
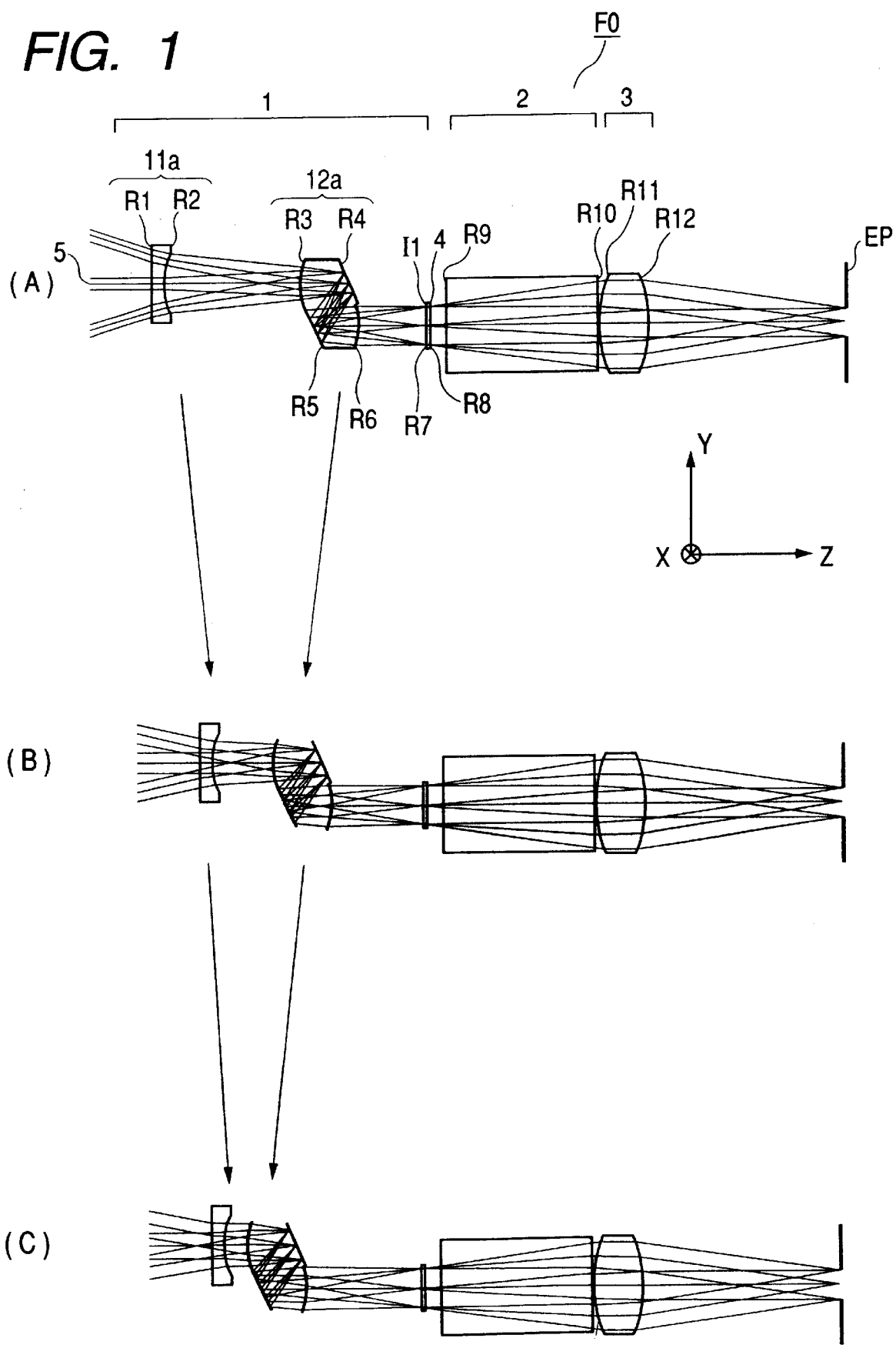
FIG. 1 shows sectional views of the main part of a finder system according to the first embodiment.

A finder system according to each embodiment of the present invention, which has a real-image variable focal length function, will be described next. FIG. 1 shows sectional views of the main part of a finder system according to the first embodiment of the present invention. Referring to FIG. 1, a real-image finder system F0 has an objective optical system (optical lens system) 1, an erecting optical system 2 such as a Schmidt prism, and an eyepiece optical system (eyepiece lens system) 3. The finder system also has a pupil point (eye point) EP, a finder field frame (field frame) 4 for limiting the observation field, and a reference axis 5 of a finder system 21.

An object image is formed on a primary imaging plane I1 by the objective lens 1. The objective lens 1 has a lens (optical member) 11a formed from a spherical system (or aspherical system) having negative optical power and an optical element 12a having a shape to be described later and a reflecting surface tilted with respect to the reference axis. The finder magnification is changed by changing the relative positions of the two optical elements, as indicated by arrows. The lens 11a may be a lens having positive optical power. FIG. 1 shows the maximum wide-angle state (A), the zoom position at the intermediate focal length (B), and the maximum telephoto state (C).

The optical element has an incident surface R3 where a light beam becomes incident on the surface of the transparent body, a plurality of reflecting surfaces R4 and R5 each having a curvature, and an exit surface R6 from which the light beam reflected by the plurality of reflecting surfaces emerges. The optical element 12a constructs one element of the objective optical system 1. Some of the plurality of reflecting surfaces of the optical element 12a may be flat.

An optical device of the present invention, such as a video camera, still camera, or digital camera, has the finder system shown in FIG. 1, and an image sensing lens (zoom lens).

The imaging state of the finder system of the present invention will be described next with reference to FIG. 1. A light beam from an object (not shown) becomes incident on the objective lens system 1 first.

In the objective lens system 1, the light beam diverges by the negative optical power of the concave (negative) lens 11a and then becomes incident on the optical element 12a arranged on the rear side of the concave lens 11a.

The optical element 12a has two reflecting surfaces and two refracting surfaces sequentially from the object side: the first refracting surface R3 having positive optical power (refracting power), the concave mirror R4 serving as a first reflecting surface, the concave mirror R5 serving as a second reflecting surface, and the second refracting surface R6 having positive optical power. (More than two reflecting surfaces may be prepared).

The light beam from the concave lens 11a becomes incident on the first refracting surface R3 and then on the concave mirror R4 while converging due to the positive optical power of the first refracting surface R3.

The concave mirror R4 reflects the object light beam in the Y (−) and Z (−) directions in FIG. 1 to converge the object light beam and make it incident on the concave mirror R5 by the positive optical power of the concave mirror R4.

By reflecting the light beam in the Z (−) direction, i.e., a direction reverse to the incident direction, the total finder length is reduced.

The concave mirror R5 converges the converged light beam from the concave mirror R4 by the positive optical power of the Concave mirror R5 and also reflects the light beam in the Z (+) direction parallel to the incident direction.

The object light beam reflected by the concave mirror R5 further converges and forms an object image on the primary imaging plane Ii due to the positive optical power of the second refracting surface R6.

In this embodiment, the imaging magnification (finder magnification) is changed by changing the relative positions of the concave lens 11a and the optical element 12a.

As described above, in this embodiment, in a finder having the function of forming an image of a light beam from an object, the function of erecting the formed object image, and the function of observing the erect object image, at least one optical element is provided, which is made by integrally molding, on the surface of a transparent body, a refracting surface on which the light beam becomes incident, a plurality of reflecting surfaces each having a curvature, and a refracting surface from which the light beam reflected by the plurality of reflecting surfaces emerges. The optical element has a function of forming the image of the light beam from the object and moves to change the observation magnification of the finder.

As shown in FIG. 1, the imaging magnification is changed from the maximum wide-angle state to the maximum telephoto state by monotonically moving the concave lens 11a to the observation side and simultaneously moving the optical element 12a to the object side.

In this embodiment, the field frame 4 is arranged, which has a variable opening shape and limits the observation region to almost the same position as the primary imaging plane I1.

The field frame 4 can have not only the function of limiting the observation region but also a function that has become popular recently, i.e., the function of changing the X- and Y-direction sizes in FIG. 1 for switching of the image sensing window.

The object light beam that has formed its image on the primary imaging plane I1 reaches the erecting optical system 2. For example, an erecting prism such as a Schmidt prism is used as the erecting optical system 2 to invert the object image formed as an inverted image and convert it into an erected image and also guiding the light beam to the eyepiece optical system 3 arranged on the rear side of the erecting optical system 2. The object image and the field frame image can be simultaneously observed at the observation pupil EP through the eyepiece optical system 3.

In the finder system of the camera as in this embodiment, the lens of the finder system is often formed from only a plastic material such as acrylic or polycarbonate resin. There is little freedom in selecting the material for balancing the Petzval sum and chromatic aberration. For this reason, as finder systems are increasingly equipped with a zooming function, aberrations, and particularly, chromatic aberration can hardly be corrected.

As a measure, an optical element including a reflecting surface having a curvature is arranged in the objective lens system in this embodiment. Since this reflecting surface has a predetermined reflection angle independently of the wavelength, no chromatic aberration occurs. Even when only a plastic material such as acrylic or polycarbonate resin is used in the finder system, chromatic aberration can be suppressed, and aberrations can be satisfactorily corrected by distributing power to such a reflecting surface.

As described above, in this embodiment, an optical element having a plurality of reflecting surfaces each having a curvature on the surface of a transparent body is used in the objective optical system, thereby constructing a finder system having a real-image variable focal length function with a simple arrangement.

The optical element used in the above embodiment has two reflecting surfaces. However, the number of reflecting surfaces is not limited to this, and an arbitrary number of reflecting surfaces can be used.

The finder magnification may be changed by moving one of the concave lens 11a and optical element 12a. An optical element identical to that used in the objective lens 1 may be used in the eyepiece optical system 3.

Figure 2:
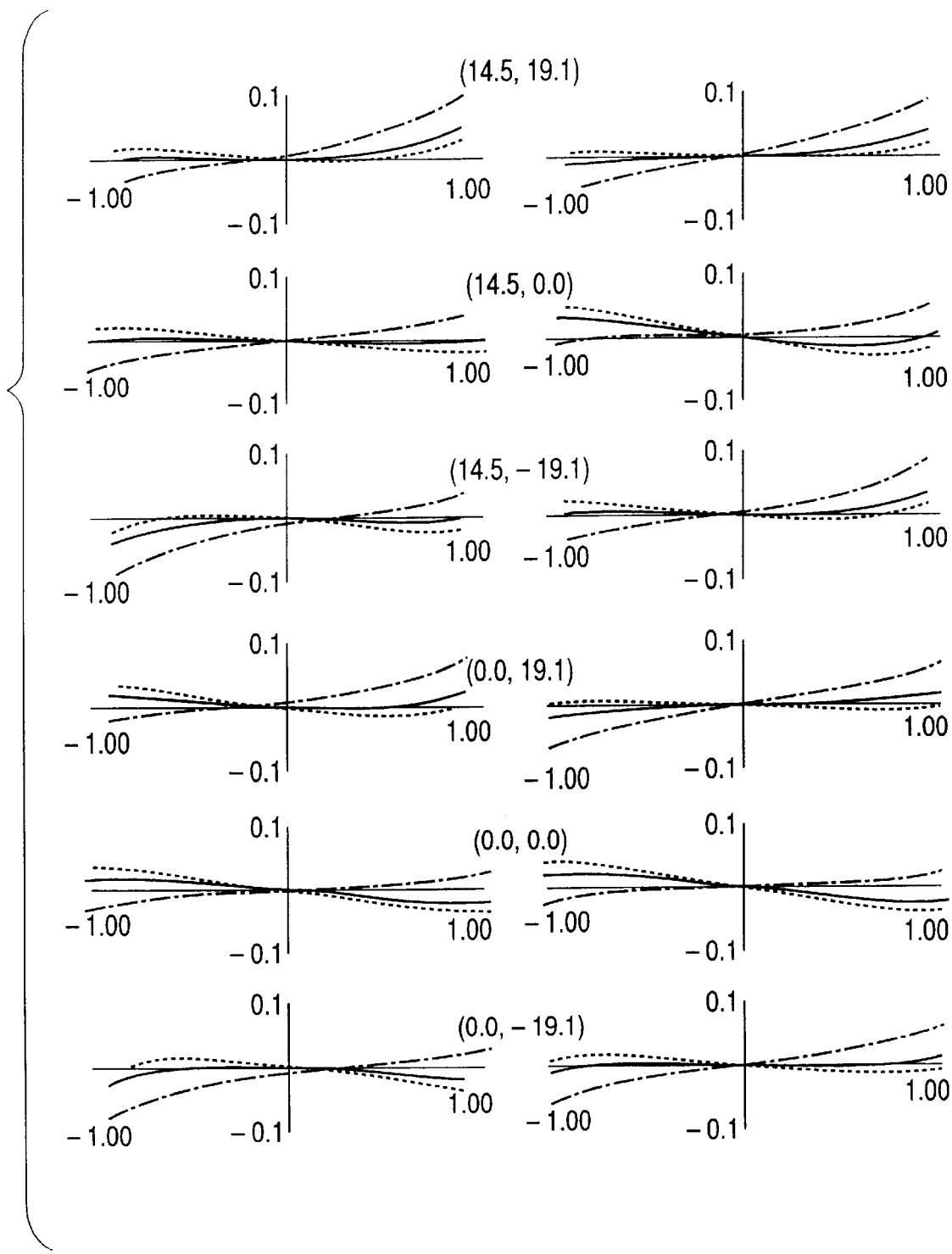
FIG. 2 shows aberration charts in the maximum wide-angle state of the finder system according to the first embodiment.
Figure 3:
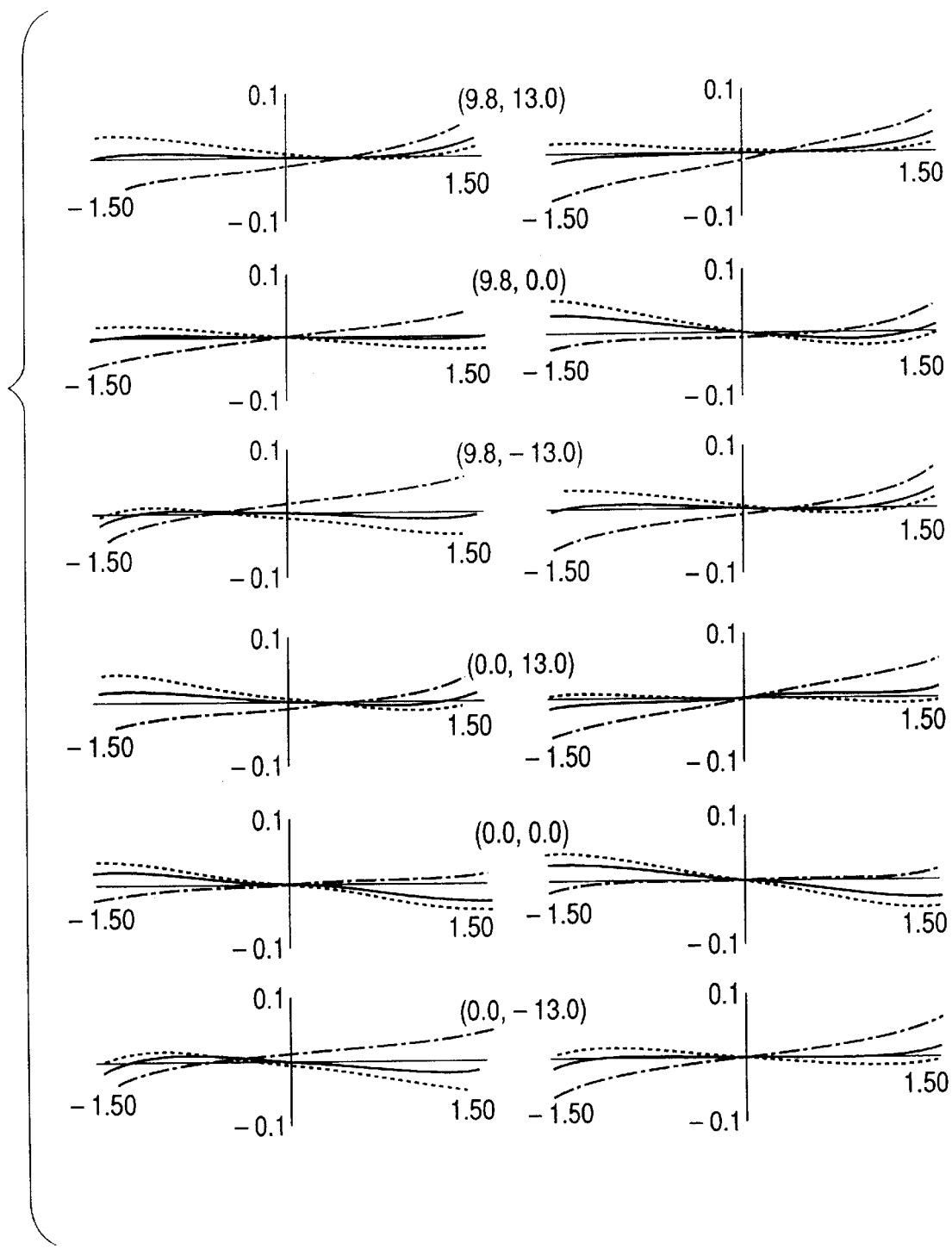
FIG. 3 shows aberration charts at the intermediate focal length of the finder system according to the first embodiment.
Figure 4:
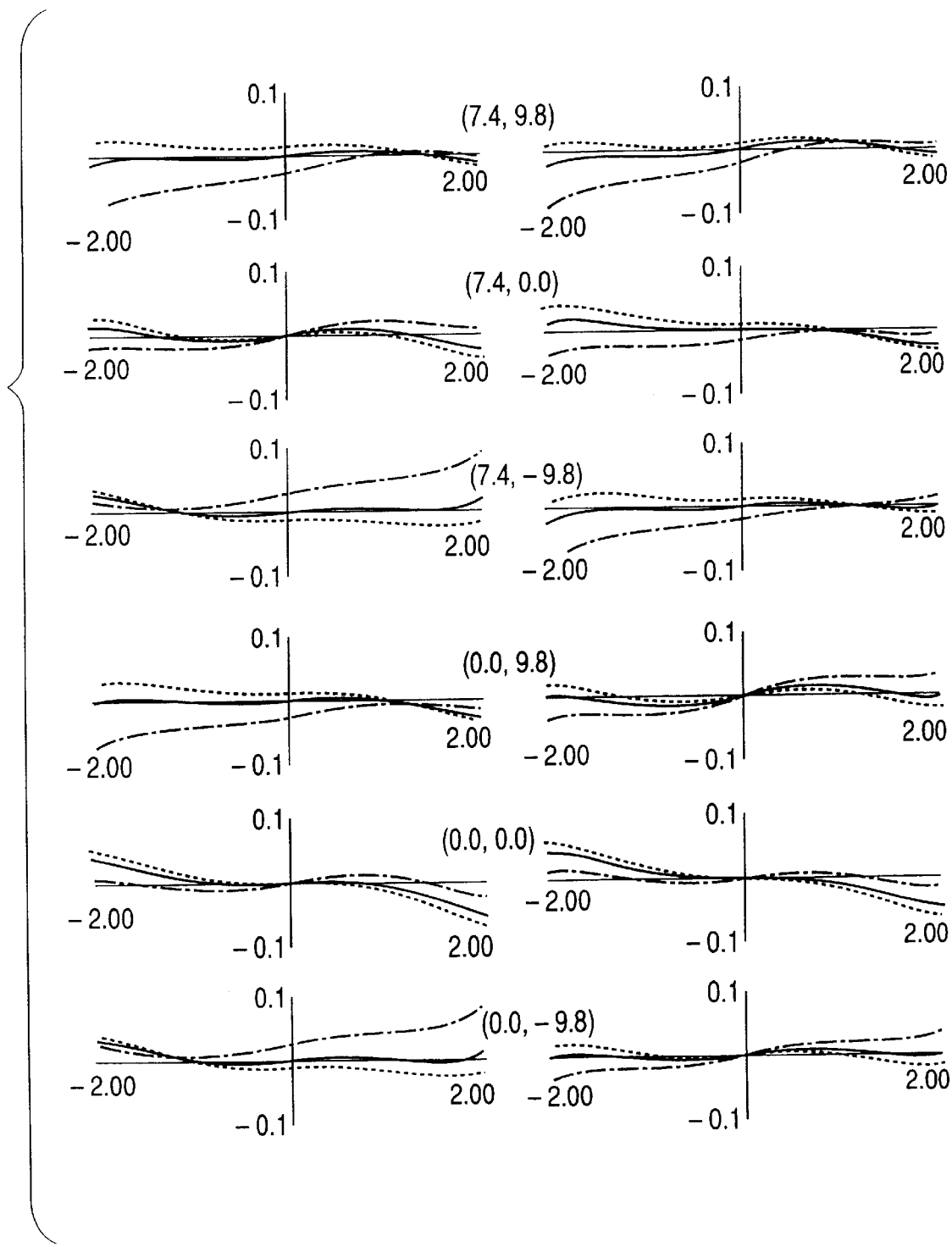
FIG. 4 shows aberration charts in the maximum telephoto state of the finder system according to the first embodiment.

FIGS. 2 to 4 show aberration charts of the first embodiment. FIG. 2 shows aberration charts in the maximum wide-angle state, FIG. 3 shows those at the intermediate focal length, and FIG. 4 shows those in the maximum telephoto state.

Numerical data of this embodiment are as follows.

[First Embodiment]

| Pupil Diameter | φ4.5 | | |
|---|---|---|---|
| Design Distance | 2 m | | |
| Observation Diopter | −1 dpt | | |

| | Wide Angle End | Intermediate focal length | Telephoto end |
|---|---|---|---|
| Finder Magnification | −0.44 | −0.65 | −0.86 |
| Horizontal half field Angle | 19.1 | 13.0 | 9.8 |
| Vertical half field Angle | 14.5 | 9.8 | 7.4 |

| i | Yi | Zi(W) | θi | Di | Ndi | νdi | |
|---|---|---|---|---|---|---|---|
| 1 | 0.00 | 0.00 | 0.00 | 2.00 | 1.58310 | 30.20 | Refraction surface |
| 2 | 0.00 | 2.00 | 0.00 | Variable | 1 | | Refraction Surface |
| 3 | 0.00 | 23.52 | 0.00 | 7.80 | 1.49171 | 57.40 | Refraction Surface |
| 4 | 0.00 | 31.32 | 25.00 | 9.00 | 1.49171 | 57.40 | Reflection Surface |
| 5 | −6.89 | 25.54 | 25.00 | 7.50 | 1.49171 | 57.40 | Reflection Surface |
| 6 | −6.89 | 33.04 | 0.00 | Variable | 1 | | Refraction Surface |
| 7 | −6.89 | 43.37 | 0.00 | 0.60 | 1.49171 | 57.40 | Refraction Surface |
| 8 | −6.89 | 43.97 | 0.00 | 2.54 | 1 | | Refraction Surface |
| 9 | −6.89 | 46.51 | 0.00 | 24.00 | 1.57090 | 33.80 | Refraction Surface |
| 10 | −6.89 | 70.51 | 0.00 | 0.25 | 1 | | Refraction Surface |
| 11 | −6.89 | 70.76 | 0.00 | 8.00 | 1.49171 | 57.40 | Refraction Surface |
| 12 | −6.89 | 78.76 | 0.00 | 31.50 | 1 | | Refraction Surface |
| 13 | −6.89 | 110.25 | 0.00 | 0.00 | 1 | | Eye Point |

| | Wide Angle End | Intermediate focal length | Telephoto end |
|---|---|---|---|
| D2 | 21.52 | 9.62 | 3.70 |
| D6 | 10.33 | 14.18 | 18.08 |

| D1 to 2 Surface | $Zi(M) = Zi(W) + 8.05$ | $Zi(T) = Zi(W) + 10.08$ |
|---|---|---|
| D3 to 6 Surface | $Zi(M) = Zi(W) − 3.85$ | $Zi(T) = Zi(W) − 7.75$ |

Spherical Configuration

| R3 Surface | $R3 = 10.032$ |
|---|---|
| R7 Surface | $R7 = \infty$ |
| R8 Surface | $R8 = \infty$ |
| R9 Surface | $R9 = \infty$ |
| R10 Surface | $R10 = \infty$ |
| R11 Surface | $R11 = 20.045$ |

Aspherical Configuration

| R1 Surface | $R1 = 1302.386$ | $k = 37908.845$ | $a = 1.48677e−04$ | $b = −7.77060e−07$ |
|---|---|---|---|---|
| R2 Surface | $R2 = 11.823$ | $k = 1.211$ | $a = 1.23833e−04$ | $b = −2.91939e−06$ |
| R6 Surface | $R6 = −12.000$ | $k = 1.440$ | $a = 4.40479e−05$ | $b = 2.01322e−06$ |
| R12 Surface | $R12 = −19.550$ | $k = −0.670$ | $a = 4.51250e−05$ | $b = 9.22065e−08$ |

Free Curved Surface Configuration

R4 Surface
$C_{02} = −4.87350e−04$   $C_{20} = −5.72436e−04$
$C_{03} = 6.13117e−06$   $C_{21} = −2.83694e−06$
$C_{04} = 2.66756e−05$   $C_{22} = 7.88775e−05$   $C_{40} = 3.92457e−05$
$C_{05} = −8.08930e−07$   $C_{23} = −1.68269e−06$   $C_{41} = −5.94753e−07$ -continued

|  |  |  |  |
|---|---|---|---|
|  | $C_{06} = -8.30314e-07$ | $C_{24} = -5.49336e-06$ | $C_{42} = -7.30506e-06$ |
|  | $C_{60} = -1.79143e-06$ |  |  |
| R5 Surface | $C_{02} = 2.18268e-04$ | $C_{20} = 2.50890e-04$ |  |
|  | $C_{03} = 4.23121e-06$ | $C_{21} = -1.08893e-05$ |  |
|  | $C_{04} = -3.63165e-05$ | $C_{22} = -7.87687e-05$ | $C_{40} = -5.32581e-05$ |
|  | $C_{05} = -1.11203e-06$ | $C_{23} = -1.84747e-06$ | $C_{41} = -2.52894e-07$ |
|  | $C_{06} = 1.17134e-07$ | $C_{24} = 5.56613e-07$ | $C_{42} = -3.97419e-07$ |
|  | $C_{60} = 3.32152e-07$ |  |  |

A finder system according to another embodiment of the present invention, which has a real-image variable focal length function, will be described next. FIG. 5 shows sectional views of the main part of a finder system according to the second embodiment of the present invention. Referring to FIG. 5, a real-image finder system F0 has an objective optical system (optical lens system) 1, an erecting optical system 2 for an erected image, and an eyepiece optical system (eyepiece lens system) 3. The finder system also has a pupil point (eye point) EP of the observer, a finder field frame (eye frame) 4 for limiting the observation field, and a reference axis 5 of a finder system 21.

This system has a primary imaging plane I1 and a secondary imaging plane I2. The objective lens system 1 and the erecting optical system 2 are formed from optical elements 11b and 12, respectively, each of which is made by integrally molding, on the surface of a transparent body, an incident surface on which a light beam becomes incident, a plurality of reflecting surfaces each having a curvature, and an exit surface from which the light beam reflected by the plurality of reflecting surfaces emerges.

Some of the plurality of reflecting surfaces of the optical elements 11b and 12b may be flat.

In this embodiment, the finder magnification is changed by moving the two optical elements 11b and 12b, as indicated by the arrows in FIG. 5 to change the relative positions of the two optical elements.

FIG. 5 shows the maximum wide-angle state (A), the zoom position at the intermediate focal length (B), and the maximum telephoto state (C).

An optical device of the present invention, such as a video camera, a still camera, or a digital camera, has the finder system shown in FIG. 5, and an image sensing lens.

The imaging state of the finder system of the second embodiment will be described next with reference to FIG. 5. A light beam from an object (not shown) becomes incident on the objective lens system 1 first.

The objective lens system 1 is formed from the optical element 11b having a plurality of reflecting surfaces each having a curvature on the surface of a transparent body made of a plastic or glass material.

The optical element 11b has two reflecting surfaces and two refracting surfaces sequentially from the object side: a first refracting surface (incident surface) R1 having positive optical power, a concave mirror R2 serving as a first reflecting surface, a concave mirror R3 serving as a second reflecting surface, and a second refracting surface (exit surface) R4 having positive optical power. An arbitrary number of reflecting surfaces can be used.

The light beam from an object becomes incident on the first refracting surface R1 and then on the concave mirror R2 while converging due to the positive optical power of the first refracting surface R1.

The concave mirror R2 reflects the object light beam in the Y (−) and Z (−) directions in FIG. 5 to converge the object light beam and make it incident on the concave mirror R7 by the positive optical power of the concave mirror R3.

By reflecting the light beam in the Z (−) direction, i.e., a direction reverse to the incident direction, the total finder length is reduced.

The concave mirror R3 converges the collimated light beam from the concave mirror R2 by the positive optical power of the concave mirror R3 and also reflects the light beam in the Z (+) direction parallel to the incident direction.

The object light beam reflected by the concave mirror R3 forms an object image on the primary imaging plane I1 due to the positive optical power of the concave mirror R3.

The light beam from the object image formed on the primary imaging plane I1 emerges from the second refracting surface R4 and reaches the erecting optical system 2.

The erecting optical system 2 is formed from the optical element 12 having two refracting surfaces and a plurality of reflecting surfaces each having a curvature, like the optical element 11b of the objective lens system 1.

The optical element 12b has two reflecting surfaces and two refracting surfaces sequentially from the object side: a first refracting surface R5 having positive optical power, a concave mirror R6 serving as a first reflecting surface, a convex mirror R7 serving as a second reflecting surface, and a second refracting surface R8 having positive optical power. More than two reflecting surfaces may be prepared.

The light beam incident on the first refracting surface R5 of the optical element 12b of the erecting optical system 2 converges the diverged light beam from the primary imaging plane I1 and makes the light beam become incident on the concave mirror R6 by the positive optical power of the first refracting surface R5.

The concave mirror R6 reflects the object light beam in the Y (+) and Z (−) directions in FIG. 5 to converge the light beam from the first refracting surface R5 and make it incident on the convex mirror R7 by the positive optical power of the concave mirror R6.

By reflecting the light beam in the Z (−) direction, i.e., a direction reverse to the incident direction, the total finder length is reduced, as in the optical element 11b.

In this embodiment, the light beam is reflected in the Y (+) direction, unlike the optical element 11b. The light beam may be reflected in the Y (−) direction. Hence, the finder system can have a degree of freedom in layout in the finder system.

The convex mirror R7 decreases the angle of convergence of the converged light beam from the concave mirror R6 by the negative optical power and also reflects the light beam in the Z (+) direction parallel to the incident direction.

The object light beam reflected by the convex mirror R7 re-forms an object image on the secondary imaging plane I2 while converging due to the positive optical power of the second refracting surface R8.

The re-formed object image is superposed on the field frame 4, which is disposed at almost the same position as the secondary imaging plane and limits the observation region, and is observed at the pupil point EP by the eyepiece optical system 3 arranged on the rear side of the erecting optical system 2.

In this embodiment, the imaging magnification (finder magnification) is changed by changing the relative positions of the optical elements 11b and 12b.

As described above, in this embodiment, in a finder having the function of forming an image of a light beam from an object, the function of erecting the formed object image, and the function of observing the erect object image, an optical element is used, which is made by integrally molding, on the surface of a transparent body, a refracting surface on which the light beam become incident, a plurality of reflecting surfaces each having a curvature, and a refracting surface from which the light beam reflected by the plurality of reflecting surfaces emerges. The optical element has at least one of the above functions and moves to change the observation magnification of the finder.

As shown in FIG. 5, the imaging magnification is changed from the maximum wide-angle state to the maximum telephoto state by moving the optical element 11b to the object side and simultaneously moving the optical element 12b to the object side while reducing the interval between the optical elements 11b and 12b, as indicated by the arrows.

The field frame 4 arranged on the secondary imaging plane I2 can have not only the function of limiting the observation region but also a function that has become popular recently, i.e., the function of changing the X- and Y-direction sizes in FIG. 5 for switching of the image sensing window.

In the finder system of the camera as in this embodiment, the lens of the finder system is often formed from only a plastic material such as acrylic or polycarbonate resin. There is little freedom in selecting a material for balancing the Petzval sum and chromatic aberration. For this reason, as finder systems are increasingly equipped with a zooming function, aberrations, and particularly, chromatic aberration can hardly be corrected.

As a measure, an optical element including a reflecting surface having a curvature is arranged in the objective lens system in this embodiment. Since this reflecting surface has a predetermined reflection angle independently of the wavelength, no chromatic aberration occurs. Even when only a plastic material such as acrylic or polycarbonate resin is used in the finder system, chromatic aberration can be suppressed, and aberrations can be satisfactorily corrected by distributing power to such a reflecting surface.

As described above, in this embodiment, each of the objective optical systems having the function of forming the image of a light beam from an object and the erecting optical system having the function of erecting the formed object image is constructed by an optical element having a plurality of reflecting surfaces each having a curvature, the magnification is changed by moving the two optical elements, and the functions are achieved by one optical element, so a finder system having a secondary imaging zooming function is implemented by only three optical members.

As described above, in this embodiment, at least two optical elements each having a plurality of reflecting surfaces each having a curvature on the surface of a transparent body is used in the objective optical system, thereby constructing a finder system having a real-image variable focal length function with a simple arrangement.

The optical element used in the above embodiment has two reflecting surfaces. However, the number of reflecting surfaces is not limited to this, and an arbitrary number of reflecting surfaces can be used.

Figure 6:
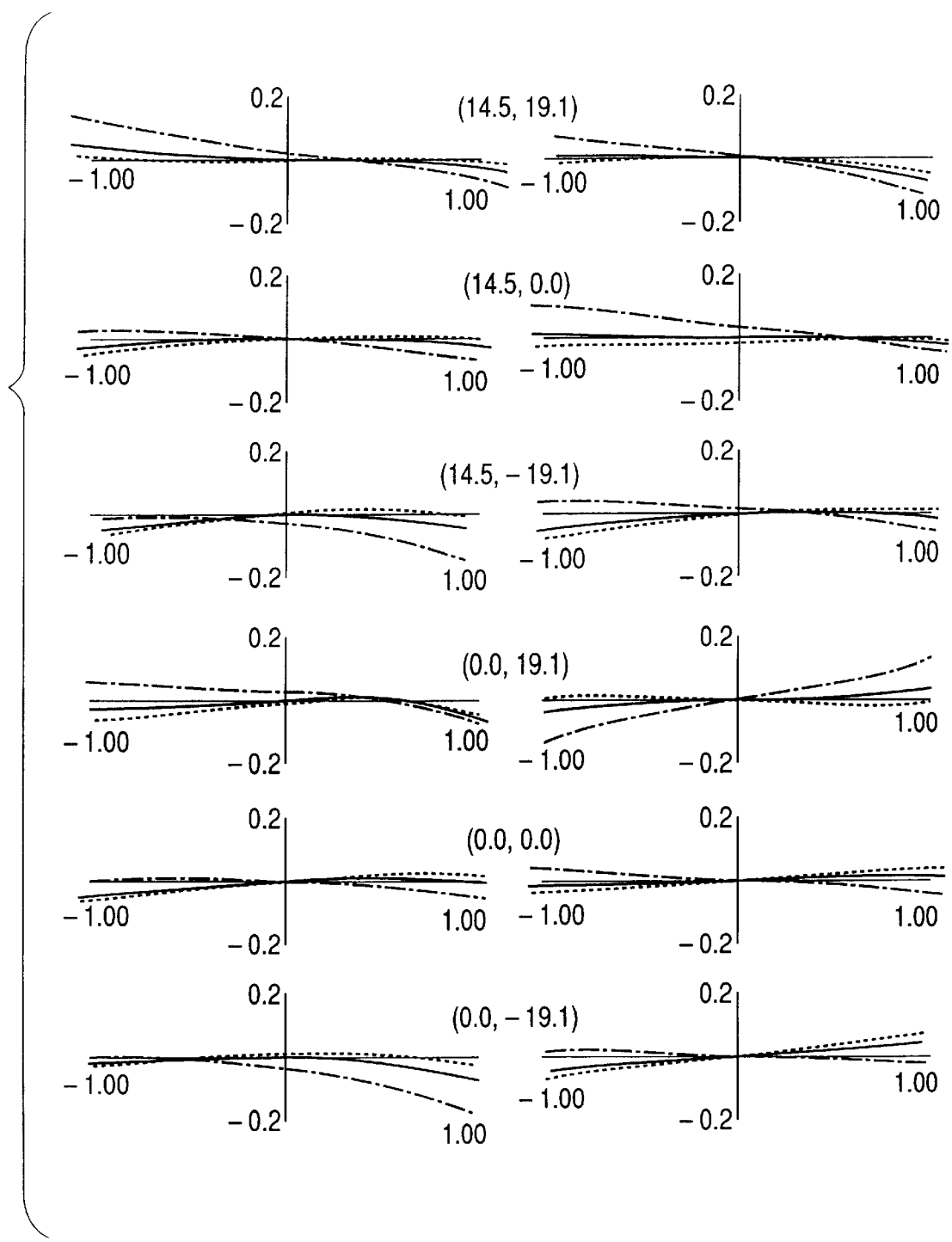
FIG. 6 shows aberration charts in the maximum wide-angle state of the finder system according to the second embodiment.
Figure 7:
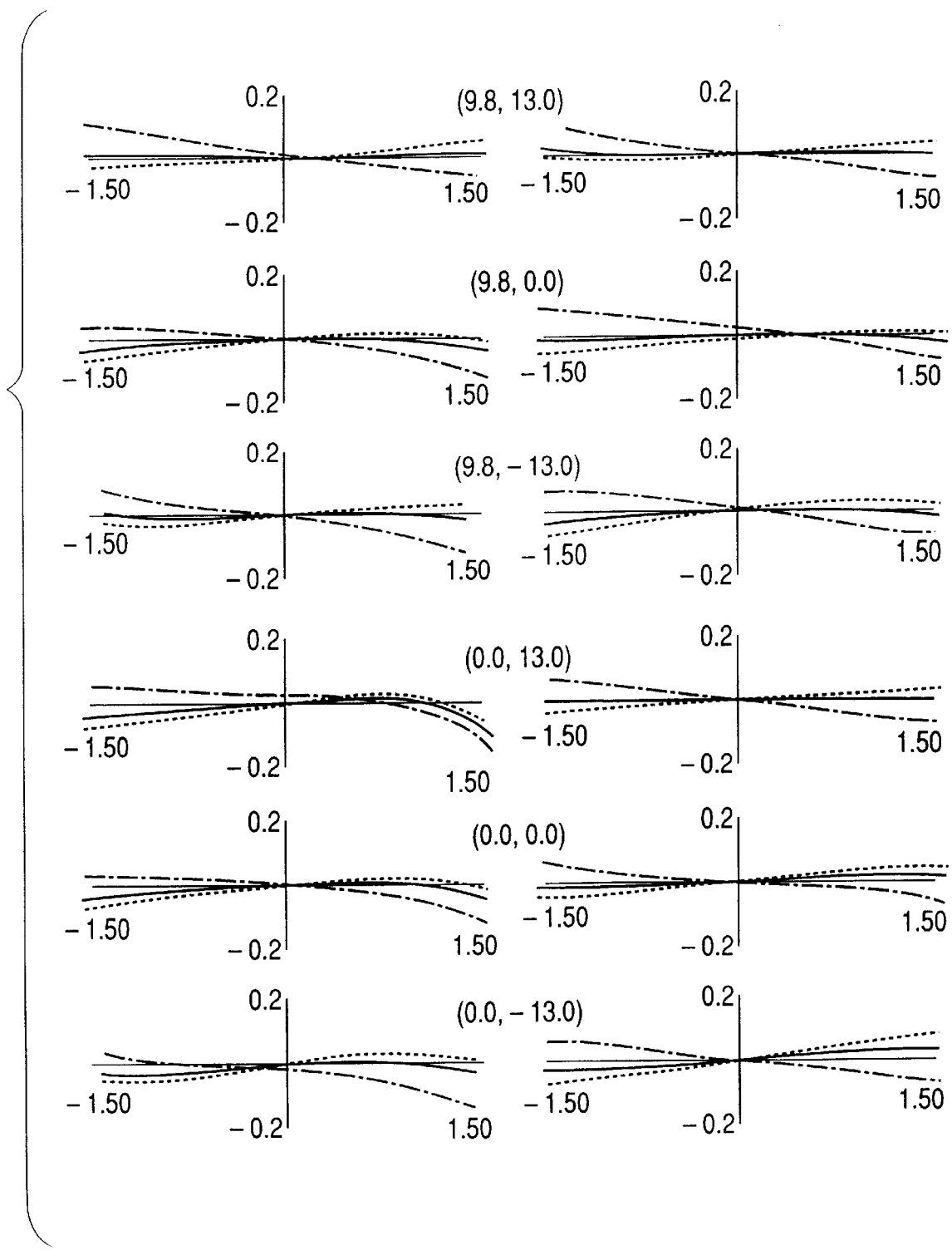
FIG. 7 shows aberration charts at the intermediate focal length of the finder system according to the second embodiment.
Figure 8:
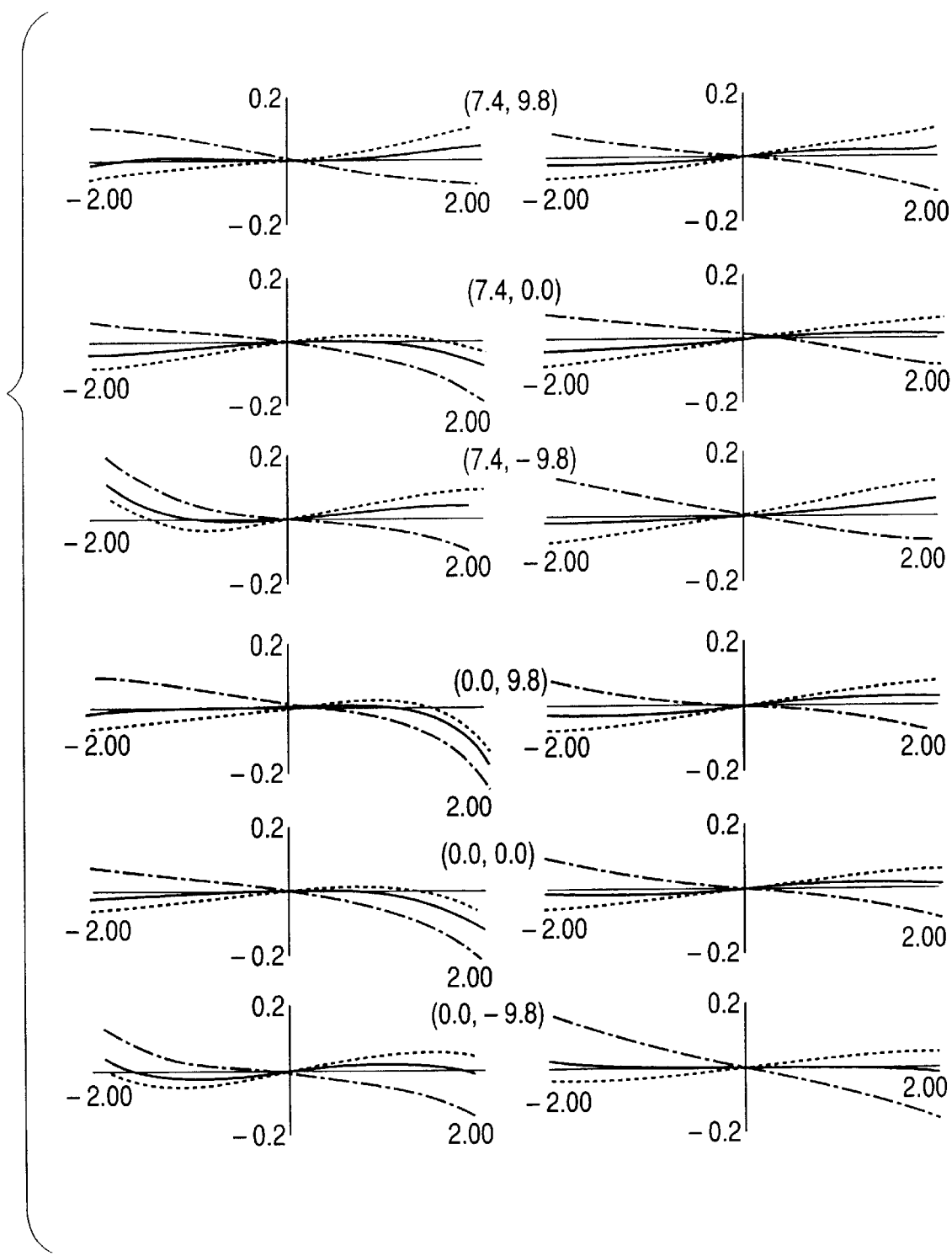
FIG. 8 shows aberration charts in the maximum telephoto state of the finder system according to the second embodiment.

FIGS. 6 to 8 show aberration charts of the finder system of the second embodiment. FIG. 6 shows aberration charts in the maximum wide-angle state, FIG. 7 shows those at the intermediate focal length, and FIG. 8 shows those in the maximum telephoto state.

Figure 9:
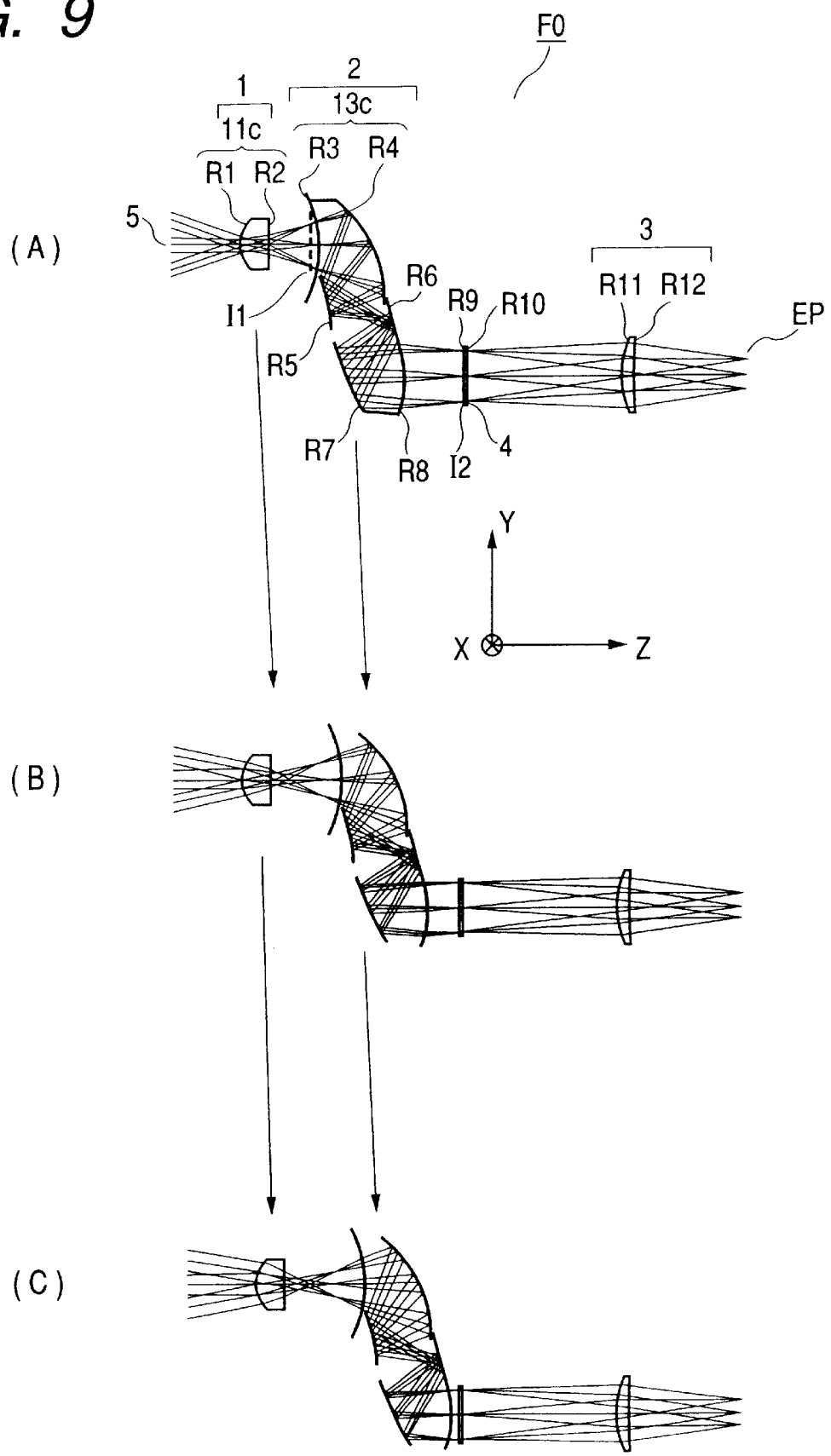
FIG. 9 shows sectional views of the main part of a finder system according to the third embodiment.

FIG. 9 shows sectional views of the main part of a finder system according to another embodiment (third embodiment) of the present invention.

Referring to FIG. 9, the finder system comprises an objective lens system 1 having the function of forming the image of a light beam from an object, a primary imaging plane I1 on which the object image is formed, an erecting optical system 2 having the function of erecting the object image formed on the primary imaging plane I1, a secondary imaging plane I2 on which the erected image is formed, an eyepiece lens system 3 having the function of observing the object image erecting on the secondary imaging plane I2, a field frame 4, a reference axis 5 of the finder system, and an observation pupil EP.

The imaging state of the finder system of this embodiment will be described next with reference to FIG. 9.

A light beam from an object (not shown) becomes incident on the objective lens system 1 first. The objective lens system 1 is constructed by a convex lens (positive lens) 11c formed from a spherical system having positive optical power.

The light beam from the object becomes incident on the convex lens 11c and forms the object image on the primary imaging plane I1 due to the positive optical power of the convex lens 11c.

The object light beam whose image is formed on the primary imaging plane I1 reaches the erecting optical system 2. The erecting optical system 2 is constructed by an optical element 13c having a plurality of reflecting surfaces each having a curvature.

The optical element 13c has four reflecting surfaces and two refracting surfaces sequentially from the object side: a first refracting surface (incident surface) R3 having negative optical power, a concave mirror R4 serving as a first reflecting surface, a convex mirror R5 serving as a second reflecting surface, a concave mirror R6 serving as a third reflecting surface, a concave mirror R7 serving as a fourth reflecting surface, and a second refracting surface (exit surface) R8 having positive optical power.

An arbitrary number of reflecting surfaces can be used. The light beam incident on the first refracting surface R3 of the optical element 13c and diverging from the primary imaging plane I1 further diverges due to the negative optical power of the first refracting surface R3 and becomes incident on the concave mirror R4.

The concave mirror R4 reflects the object light beam in the Y (−) and Z (−) directions in FIG. 9 to converge the light beam from the first refracting surface R3 and make it incident on the concave mirror R5 by the positive optical power of the concave mirror R4.

By reflecting the light beam in the Z (−) a direction, i.e., a direction reverse to the incident direction, the total finder length is reduced, as in the second embodiment.

The convex mirror R5 reflects the light beam from the concave mirror R4 in the Y (−) and Z (+) directions in FIG. 9 to diverge the light beam from the concave mirror R4 and make it incident on the concave mirror R6 by the negative optical power of the convex mirror R5.

The light beam reflected by the concave mirror R6 becomes incident on the concave mirror R7 and is reflected in the Z (+) direction to converge due to the positive optical power of the concave mirror R7 parallel to the incident direction.

The object light beam reflected by the concave mirror R7 further converges and re-forms an object image on the secondary imaging plane I2 due to the positive optical power of the second refracting surface R8.

The re-formed object image is superposed on the field frame 4, which is disposed at almost the same position as the secondary imaging plane I2 and limits the observation region, and is observed at the observation pupil EP by the eyepiece optical system 3 arranged on the rear side of the erecting optical system 2.

In this embodiment, the imaging magnification (finder magnification) is changed by changing the relative positions of the convex lens 11c and the optical element 13c.

As shown in FIG. 9, the imaging magnification is changed from the maximum wide-angle state to the maximum telephoto state by moving the convex lens 11c to the observation side and simultaneously moving the optical element 13c to the observation side while increasing the interval between the convex lens 11c and the optical element 13c.

As in the second embodiment, the field frame 4 arranged on the secondary imaging plane I2 can have not only the function of limiting the observation region but also a function that has become popular recently, i.e., the function of changing the X- and Y-direction sizes in FIG. 9 for switching of the image sensing window.

Figure 10:
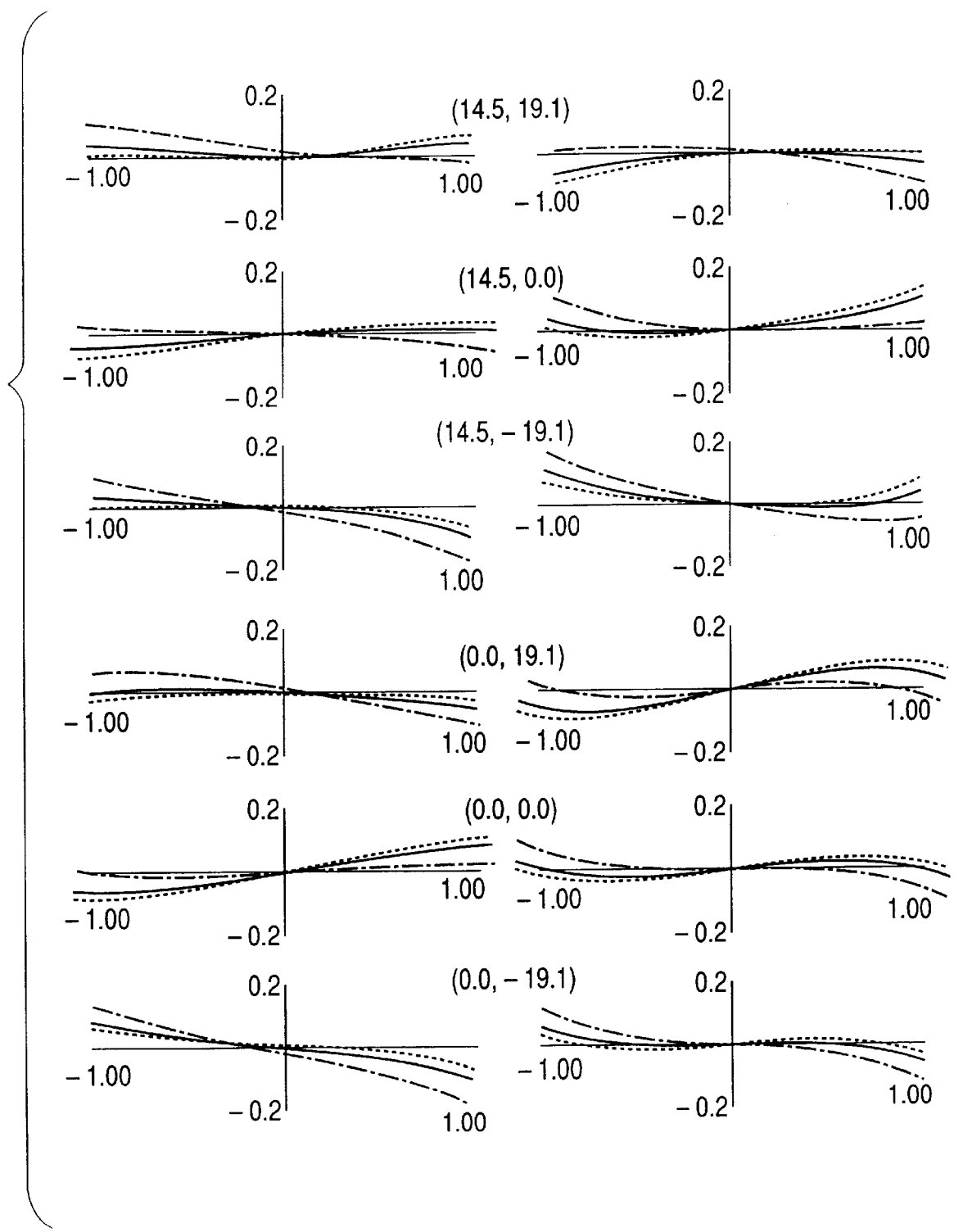
FIG. 10 shows aberration charts in the maximum wide-angle state of the finder system according to the third embodiment.
Figure 11:
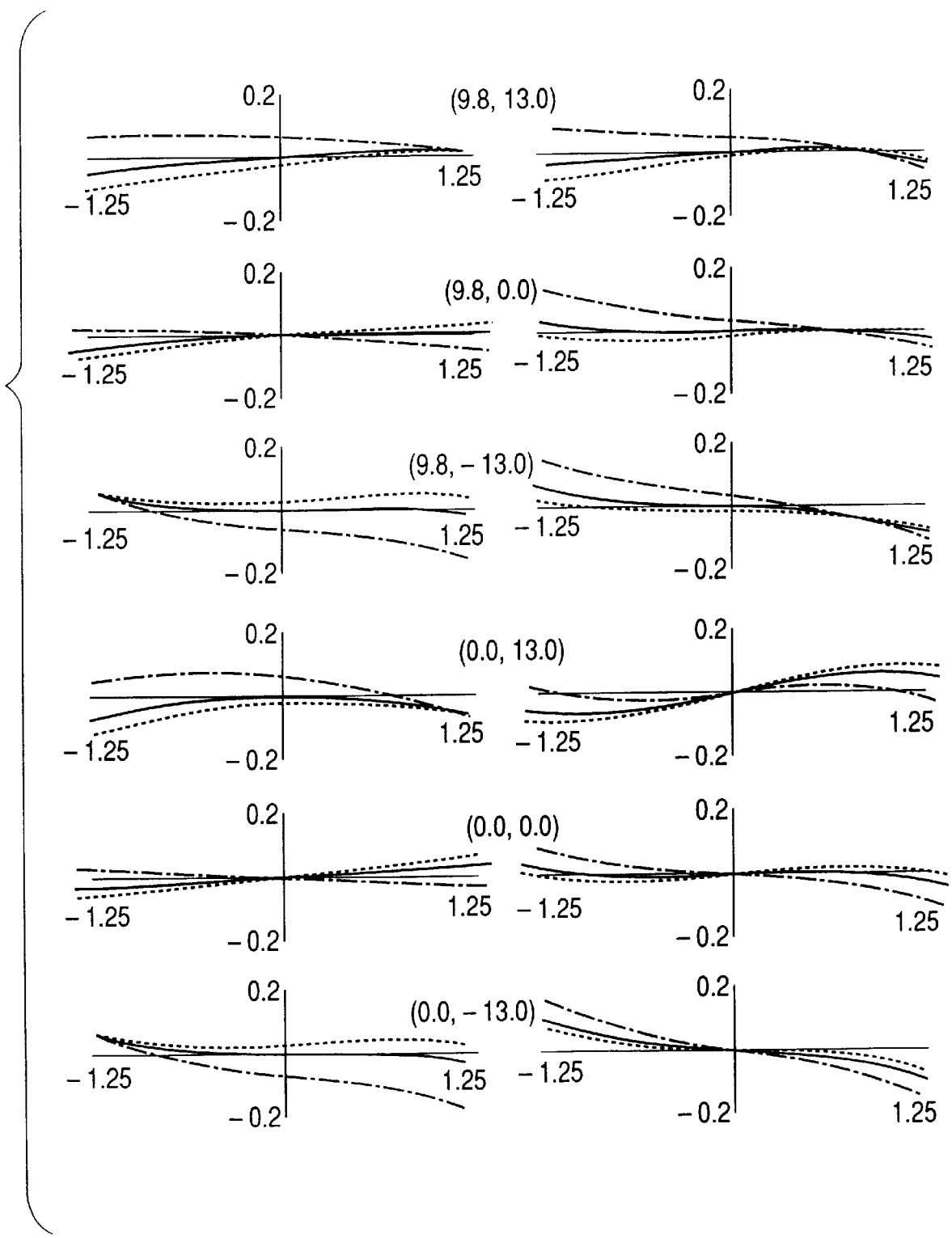
FIG. 11 shows aberration charts at the intermediate focal length of the finder system according to the third embodiment.
Figure 12:
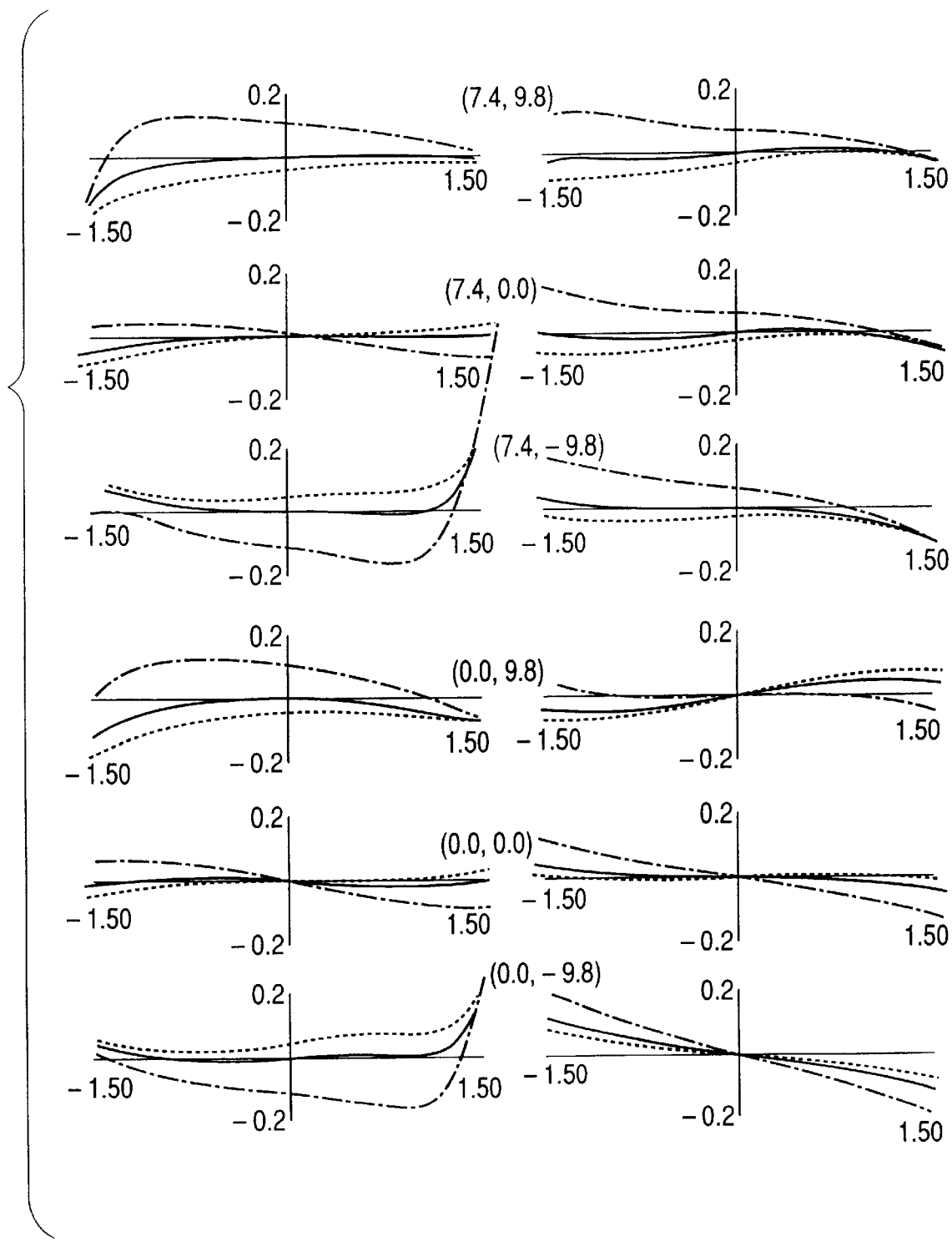
FIG. 12 shows aberration charts in the maximum telephoto state of the finder system according to the third embodiment.

FIGS. 10 to 12 show aberration charts of the finder system of the third embodiment. FIG. 10 shows aberration charts in the maximum wide-angle state, FIG. 11 shows those at the intermediate focal length, and FIG. 12 shows those in the maximum telephoto state.

As described above, in this embodiment, in the objective optical system formed from a single positive lens and the erecting optical system formed from an optical element having a plurality of reflecting surfaces each having a curvature, the magnification is changed by moving the positive lens and the optical element, and the functions are achieved by one optical element, so a finder system having a secondary imaging zooming function is implemented by only three optical members.

Numerical data of the finder systems of the second and third embodiments are as follows.

[Second Embodiment]

| Pupil Diameter | φ3.4 |
|---|---|
| Design Distance | 2 m |
| Observation Diopter | −1 dpt |

|  | Wide Angle End | Intermediate focal length | Telephoto end |
|---|---|---|---|
| Finder Magnification | −0.59 | −0.86 | −1.14 |
| Horizontal half field Angle | 19.1 | 13.0 | 9.8 |
| Vertical half field Angle | 14.5 | 9.8 | 7.4 |

| i | Yi | Zi(W) | θi | Di | Ndi | νdi |  |
|---|---|---|---|---|---|---|---|
| 1 | 0.00 | 0.00 | 0.00 | 8.50 | 1.49171 | 57.40 | Refraction surface |
| 2 | 0.00 | 8.50 | 25.00 | 10.00 | 1.49171 | 57.40 | Reflection Surface |
| 3 | −7.66 | 2.07 | 25.00 | 8.00 | 1.49171 | 57.40 | Reflection Surface |
| 4 | −7.66 | 10.07 | 0.00 | Variable | 1 |  | Refraction Surface |
| 5 | −7.66 | 17.15 | 0.00 | 8.50 | 1.49171 | 57.40 | Refraction Surface |
| 6 | −7.66 | 25.65 | −25.00 | 10.00 | 1.49171 | 57.40 | Reflection Surface |
| 7 | 0.00 | 19.23 | −25.00 | 8.50 | 1.49171 | 57.40 | Reflection Surface |
| 8 | 0.00 | 27.73 | 0.00 | Variable | 1 |  | Refraction Surface |
| 9 | 0.00 | 34.30 | 0.00 | 1.00 | 1.49171 | 57.40 | Refraction Surface |
| 10 | 0.00 | 35.30 | 0.00 | Variable | 1 |  | Refraction Surface |
| 11 | 0.00 | 57.06 | 0.00 | 4.50 | 1.49171 | 57.40 | Refraction Surface |

-continued

| | | | | | | |
|---|---|---|---|---|---|---|
| 12 | 0.00 | 61.56 | 0.00 | 30.00 | 1 | Refraction Surface |
| 13 | 0.00 | 91.56 | 0.00 | 0.00 | 1 | Eye Point |

| | Wide Angle End | Intermediate focal length | Telephoto end |
|---|---|---|---|
| D4 | 7.08 | 3.06 | 1.00 |
| D8 | 6.57 | 13.06 | 19.58 |
| D10 | 21.76 | 21.76 | 21.76 |

| | | |
|---|---|---|
| D1 to 4 Surface | $Zi(M) = Zi(W) - 2.47$ | $Zi(T) = Zi(W) - 6.92$ |
| D5 to 8 Surface | $Zi(M) = Zi(W) - 6.49$ | $Zi(T) = Zi(W) - 13.00$ |

Spherical Configuration

| | |
|---|---|
| R1 Surface | $R1 = 9.974$ |
| R4 Surface | $R4 = -11.829$ |
| R5 Surface | $R5 = 12.000$ |
| R8 Surface | $R8 = -9.496$ |
| R9 Surface | $R9 = \infty$ |
| R10 Surface | $R10 = \infty$ |

Aspherical Configuration

| | | | | |
|---|---|---|---|---|
| R11 Surface | $R11 = 20.894$ | $k = -2.020$ | $a = -4.46010e-05$ | $b = 3.35304e-07$ |
| R12 Surface | $R12 = -26.217$ | $k = -5.254$ | $a = -5.72387e-05$ | $b = 3.30707e-07$ |

Free Curved Surface Configuration

| | | | |
|---|---|---|---|
| R2 Surface | $C_{02} = -9.71213e-03$ | $C_{20} = -1.34683e-02$ | |
| | $C_{03} = 2.63402e-04$ | $C_{21} = 7.96275e-03$ | |
| | $C_{04} = 3.62602e-05$ | $C_{22} = -2.07214e-04$ | $C_{40} = -2.68116e-04$ |
| | $C_{05} = -1.54019e-05$ | $C_{23} = -3.54582e-05$ | $C_{41} = -2.10041e-04$ |
| | $C_{06} = 1.70854e-06$ | $C_{24} = 7.13032e-06$ | $C_{42} = 2.27953e-05$ |
| | $C_{60} = 1.45692e-05$ | | |
| R3 Surface | $C_{02} = 1.03645e-02$ | $C_{20} = 2.15628e-02$ | |
| | $C_{03} = -4.34848e-06$ | $C_{21} = 1.47793e-05$ | |
| | $C_{04} = -5.30109e-05$ | $C_{22} = -2.94116e-04$ | $C_{40} = 2.17257e-05$ |
| | $C_{05} = -1.80797e-05$ | $C_{23} = -6.45927e-06$ | $C_{41} = 3.95959e-05$ |
| | $C_{06} = -1.24196e-06$ | $C_{24} = 1.47358e-05$ | $C_{42} = -1.73038e-05$ |
| | $C_{60} = 6.11990e-08$ | | |
| R6 Surface | $C_{02} = -1.24893e-02$ | $C_{20} = -1.55600e-02$ | |
| | $C_{03} = -4.84023e-05$ | $C_{21} = -3.33147e-04$ | |
| | $C_{04} = 2.81557e-05$ | $C_{22} = 1.14792e-04$ | $C_{40} = 2.45722e-05$ |
| | $C_{05} = 1.40595e-05$ | $C_{23} = -5.29207e-05$ | $C_{41} = 6.24108e-06$ |
| | $C_{06} = -3.25022e-06$ | $C_{24} = 1.15255e-05$ | $C_{42} = 8.96012e-07$ |
| | $C_{60} = 9.39664e-08$ | | |
| R7 Surface | $C_{02} = -2.45963e-03$ | $C_{20} = -5.00313e-03$ | |
| | $C_{03} = -2.19294e-04$ | $C_{21} = -6.00706e-03$ | |
| | $C_{04} = -2.45086e-05$ | $C_{22} = -1.64782e-05$ | $C_{40} = -3.41198e-04$ |
| | $C_{05} = 1.70132e-05$ | $C_{23} = 9.91165e-06$ | $C_{41} = 1.30679e-04$ |
| | $C_{06} = -1.76436e-07$ | $C_{24} = 5.93074e-06$ | $C_{42} = 2.51427e-06$ |
| | $C_{60} = 6.99616e-06$ | | |

[Third Embodiment]

| | |
|---|---|
| Pupil Diameter | φ4 |
| Design Distance | 2 m |
| Observation Diopter | −1 dpt |

| | Wide Angle End | Intermediate focal length | Telephoto end |
|---|---|---|---|
| Finder Magnification | −0.43 | −0.63 | −0.84 |
| Horizontal half field Angle | 19.1 | 13.0 | 9.8 |
| Vertical half field Angle | 14.5 | 9.8 | 7.4 |

-continued

| i | Yi | Zi(W) | θi | Di | Ndi | vdi | |
|---|---|---|---|---|---|---|---|
| 1 | 0.00 | 0.00 | 0.00 | 4.20 | 1.49171 | 57.40 | Refraction surface |
| 2 | 0.00 | 4.20 | 0.00 | Variable | 1 | | Refraction Surface |
| 3 | 0.00 | 11.53 | 0.00 | 7.50 | 1.58310 | 30.20 | Refraction Surface |
| 4 | 0.00 | 19.03 | 25.00 | 10.00 | 1.58310 | 30.20 | Reflection Surface |
| 5 | −7.66 | 12.60 | 15.00 | 10.00 | 1.58310 | 30.20 | Reflection Surface |
| 6 | −11.08 | 22.00 | 15.00 | 10.00 | 1.58310 | 30.20 | Reflection Surface |
| 7 | −18.74 | 15.57 | 25.00 | 8.00 | 1.58310 | 30.20 | Reflection Surface |
| 8 | −18.74 | 23.57 | 0.00 | Variable | 1 | | Refraction Surface |
| 9 | −18.74 | 31.59 | 0.00 | 0.50 | 1.49171 | 57.40 | Refraction Surface |
| 10 | −18.74 | 32.09 | 0.00 | 21.82 | 1 | | Refraction Surface |
| 11 | −18.74 | 53.92 | 0.00 | 1.90 | 1.49171 | 57.40 | Refraction Surface |
| 12 | −18.74 | 55.82 | 0.00 | 16.00 | 1 | | Refraction Surface |
| 13 | −18.74 | 71.82 | 0.00 | 0.00 | 1 | | Eye Point |

| | Wide Angle End | Intermediate focal length | Telephoto end |
|---|---|---|---|
| D2 | 7.33 | 10.04 | 11.49 |
| D8 | 8.02 | 4.52 | 1.00 |

| D1 to 2 Surface | $Zi(M) = Zi(W) + 0.79$ | $Zi(T) = Zi(W) + 2.86$ |
|---|---|---|
| D3 to 8 Surface | $Zi(M) = Zi(W) + 3.50$ | $Zi(T) = Zi(W) + 7.02$ |
| D9 Surface | $Zi(M) = Zi(W)$ | $Zi(T) = Zi(W)$ |

Spherical Configuration

R3 Surface  R3 = −16.624
R8 Surface  R8 = −12.374
R9 Surface  R9 = ∞
R10 Surface R10 = ∞
R11 Surface R11 = 11.932

Aspherical Configuration

| R1 Surface | R1 = 4.666 | k = 0.060 | a = −9.16702e−04 | b = 0.00000e+00 |
|---|---|---|---|---|
| R2 Surface | R2 = 45.106 | k = 436.789 | a = 1.49246e−04 | b = 0.00000e+00 |
| R12 Surface | R12 = −847.976 | k = −26092.725 | a = 7.83030e−05 | b = 0.00000e+00 |

Free Curved Surface Configuration

R4 Surface
 $C_{02} = -2.71006e-02$  $C_{20} = -4.00530e-02$
 $C_{03} = 1.14103e-04$  $C_{21} = 1.41325e-04$
 $C_{04} = -2.29304e-05$  $C_{22} = -8.24239e-05$  $C_{40} = -5.48055e-05$
 $C_{05} = -1.23884e-07$  $C_{23} = 1.03303e-06$  $C_{41} = 6.18919e-07$
 $C_{06} = -1.50155e-07$  $C_{24} = -5.75738e-07$  $C_{42} = -7.64819e-07$
 $C_{60} = -3.91434e-07$ R5 Surface
 $C_{02} = -1.30187e-02$  $C_{20} = -1.11779e-01$
 $C_{03} = 2.10699e-03$  $C_{21} = 2.14042e-02$
 $C_{04} = -1.96520e-04$  $C_{22} = -1.84425e-03$  $C_{40} = 8.97784e-03$
 $C_{05} = 7.47585e-06$  $C_{23} = -2.67116e-04$  $C_{41} = -3.43701e-04$
 $C_{06} = -1.78278e-06$  $C_{24} = -1.37496e-05$  $C_{42} = -6.29668e-05$
 $C_{60} = -4.16710e-03$ R6 Surface
 $C_{02} = -5.49833e-03$  $C_{20} = -3.63526e-02$
 $C_{03} = 9.76436e-04$  $C_{21} = -5.61671e-04$
 $C_{04} = 1.51730e-04$  $C_{22} = -1.35661e-05$  $C_{40} = -1.16844e-04$
 $C_{05} = -3.92806e-05$  $C_{23} = 3.06894e-05$  $C_{41} = 1.49562e-05$
 $C_{06} = -1.09400e-05$  $C_{24} = 7.71818e-06$  $C_{42} = 1.98723e-06$
 $C_{60} = 5.10264e-07$ R7 Surface
 $C_{02} = 1.15266e-02$  $C_{20} = -8.71340e-03$
 $C_{03} = 4.92230e-04$  $C_{21} = -3.84713e-04$
 $C_{04} = -2.09449e-05$  $C_{22} = -1.07203e-04$  $C_{40} = -3.98719e-04$
 $C_{05} = -2.53816e-06$  $C_{23} = -7.06237e-07$  $C_{41} = 9.48568e-06$ -continued $C_{06} = -2.16068e{-}07$    $C_{24} = -6.12224e{-}07$    $C_{42} = 2.14123e{-}06$
$C_{60} = 4.68171e{-}06$ According to the finder system of each of the first to third embodiments, a finder system suitable for a still camera or video camera, which allows a user to satisfactorily observe a finder image (object image) at various finder magnifications while simplifying the entire optical system using an appropriately set optical element in a finder system for allowing the user to observe an object image, and an optical device having the finder system can be implemented.

Especially, a finder system having a variable focal length function with a small number of lens components can be implemented.

A finder system which satisfactorily corrects aberrations including chromatic aberration can be implemented.

The degree of freedom in laying out the elements in the finder system can be increased.

Figure 13:
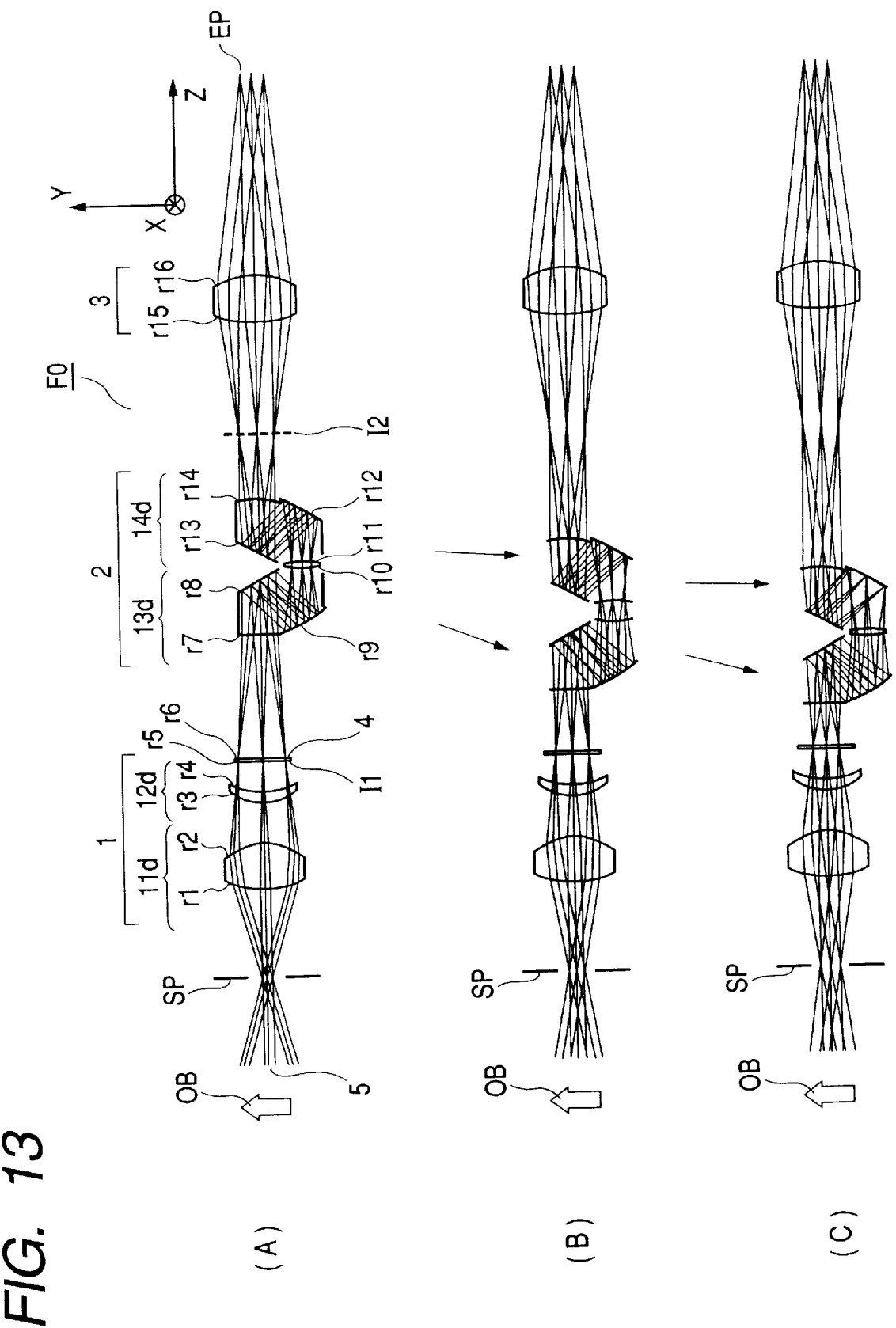
FIG. 13 shows sectional views of the main part of a finder system according to the fourth embodiment.

FIG. 13 shows sectional views of the main part of a finder system according to the fourth embodiment of the present invention. Referring to FIG. 13, a finder system FO has an objective optical system (objective lens system) 1, an erecting optical system 2 having a variable focal length function and an erecting function, an eyepiece optical system (eyepiece lens system) 3, a pupil position (eye point) EP of the observer, a finder field frame (field frame) 4 for limiting the observation field, a reference axis 5 of the read-image finder system FO, an aperture SP, a primary imaging plane I1, and a secondary imaging plane I2. An image sensing apparatus of the present invention has the read-image finder system shown in FIG. 13 as its component.

The imaging state of the read-image finder system of this embodiment will be described next.

A light beam from an object OB is limited by the aperture SP and then becomes incident on the objective lens system 1. In the objective lens system 1, the light beam from the object converges by the positive optical power of a convex lens (positive lens) 11d of the objective lens system 1, and the object image is formed on the primary imaging plane I1 by a field lens 12d arranged on the rear side of the convex lens 11d.

The field lens 12d has a function of efficiently forming the image of the exit pupil of the objective lens system 1 on the entrance pupil of the erecting optical system 2 disposed on the rear side of the objective lens system.

In this embodiment, the field frame 4 for limiting the observation field is disposed at almost the same position as the primary imaging plane I1. The field frame 4 can have not only the function of limiting the observation region but also a function that has become popular recently, i.e., the function of changing the X- and Y-direction sizes in FIG. 13 for switching of the image sensing window.

The light beam whose image is formed on the primary imaging plane I1 reaches optical elements 13d and 14d of the erecting optical system 2 having a variable focal length function and an erecting function. Each of the optical elements 13 and 14d is made by integrally molding, on the surface of a transparent body, an incident surface on which the light beam becomes incident, a plurality of reflecting surfaces each having a curvature, and an exit surface from which the light beam reflected by the plurality of reflecting surfaces emerges (Each of the optical elements 13d and 14d may have surface mirrors as the reflecting surfaces and is formed from a hollow member).

The optical element 13d has two reflecting surfaces and two refracting surfaces sequentially from the object side along the reference axis light beam (reference axis 5): a first refracting surface r7 having negative optical power, a convex mirror r8 serving as a first reflecting surface, a concave mirror r9 serving as a second reflecting surface, and a second refracting surface r10 having negative optical power.

The light beam from the primary imaging plane I1 becomes incident on the first refracting surface r7 first. The object light beam becomes incident on the convex mirror r8 while diverging due to the negative optical power of the first refracting surface r7. The convex mirror r8 reflects the object light beam in the Y (−) and Z (−) directions in FIG. 13 to diverge the object light beam and make it incident on the concave mirror r9 by the negative optical power of the convex mirror r8.

By reflecting the light beam in the Z (−) a direction, i.e., a direction reverse to the incident direction, the total finder length is reduced.

The concave mirror r9 converges the diverged light beam from the convex mirror r8 by the positive optical power of the concave mirror r9 and also reflects the light beam in the Z (+) direction in parallel to the incident direction. The object light beam reflected by the concave mirror r9 decreases its angle of convergence by the negative power of the second refracting surface r10 and emerges to the optical element 14d arranged on the rear side of the optical element 13d.

The optical element 14d has two reflecting surfaces and two refracting surfaces sequentially from the object side along the reference axis light beam (reference axis 5): a first refracting surface r11 having negative optical power, a concave mirror r12 serving as a first reflecting surface, a convex mirror r13 serving as a second reflecting surface, and a second refracting surface r14 having positive optical power.

The light beam from the optical element 13d becomes incident on the first refracting surface r11. The converged light beam from the optical element 13d is almost collimated by the negative optical power of the first refracting surface r11 and becomes incident on the concave mirror r12. The concave mirror r12 reflects the object light beam in the Y (+) and Z (−) directions in FIG. 13 to converge the light beam from the first refracting surface r11 and make it incident on the convex mirror r13.

In this case as well, by reflecting the light beam in the Z (−) direction, i.e., a direction reverse to the incident direction, the total finder length is reduced.

In this embodiment, the light beam is reflected in the Y (+) direction, unlike the optical element 13d. The light beam may be reflected in the Y (−) direction. Hence, the finder system can have a degree of freedom in layout in the finder system.

The convex mirror r13 decreases the angle of the converged light beam from the concave mirror r12 by the negative optical power of the convex mirror r13 and also reflects the light beam in the Z (+) direction in parallel to the incident direction. The object light beam reflected by the convex mirror r13 re-forms an object image on the secondary imaging plane I2 while converging due to the positive optical power of the second refracting surface t4.

In the optical elements 13d and 14d of this embodiment, the reflecting surfaces r8, r9, r2, and r13 are off-axial surfaces (each surface has a surface normal that does not match the reference axis formed by the optical path of a light beam having a reference wavelength and passing through the center of the aperture SP and center of a pupil surface 7).

The re-formed object image is observed at the observation pupil EP by the eyepiece optical system 3 arranged on the rear side of the erecting optical system 2.

In this embodiment, the object image formed on the primary imaging plane I1 is formed on the secondary imaging plane I2 at another magnification by changing the relative positions (relative positions in the Z direction) of the optical elements 13d and 14d. That is, the erecting optical system 2 has a variable focal length function capable of changing the imaging magnification (finder magnification).

FIG. 13 shows the maximum wide-angle state (A), the zoom position at the intermediate focal length (B), and the maximum telephoto state (C). The finder magnification is changed (the focal length is changed) from the maximum wide-angle state to the maximum telephoto state by monotonically moving the optical element 13d to the object side (Z-direction) and simultaneously monotonically moving the optical element 14d to the object side along a moving track different from that of the optical element 13d. At this time, the size of the field frame 4 is changed as the focal length is changed.

In the real-image finder system, the lens of the finder system is often formed from only a plastic material such as acrylic or polycarbonate resin. There is little freedom in selecting a material for balancing the Petzval sum and the chromatic aberration. For this reason, as finder systems are increasingly equipped with a zooming function, aberrations, and particularly, chromatic aberration can hardly be corrected.

As a measure, the erecting optical system 2 is constructed by two optical elements 13d and 14d each having reflecting surfaces with curvatures in this embodiment. Since each of these optical elements has a predetermined reflection angle independently of the wavelength, chromatic aberration can be suppressed, and aberrations can be satisfactorily corrected by distributing power to the reflecting surface that causes no chromatic aberration even when only a plastic material such as acrylic or polycarbonate resin is used.

The optical element used in this embodiment has two reflecting surfaces. However, the number of reflecting surfaces is not limited to this, and an arbitrary number of reflecting surfaces can be used.

FIG. 13 shows an example of the finder system of this embodiment. As the erecting optical system 2, three or more optical elements each made by integrally molding a plurality of reflecting surfaces with curvatures may be arranged, and the variable focal length (zooming) function may be implemented by moving at least two optical elements. The finder system of this embodiment can be used not only as a video camera or still camera but also as binoculars or telescope.

Figure 14:
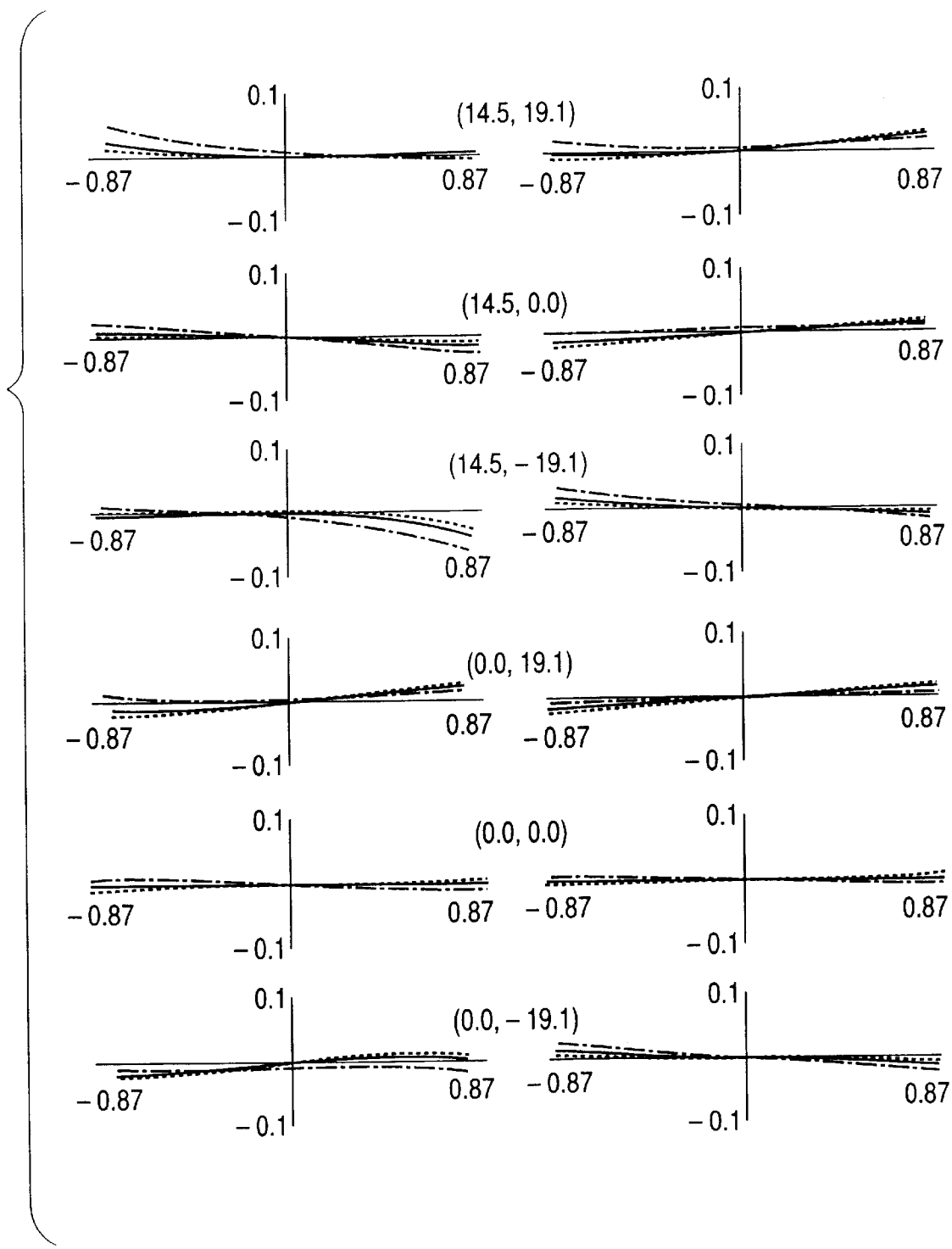
FIG. 14 shows aberration charts in the maximum wide-angle state of the finder system according to the fourth embodiment.
Figure 15:
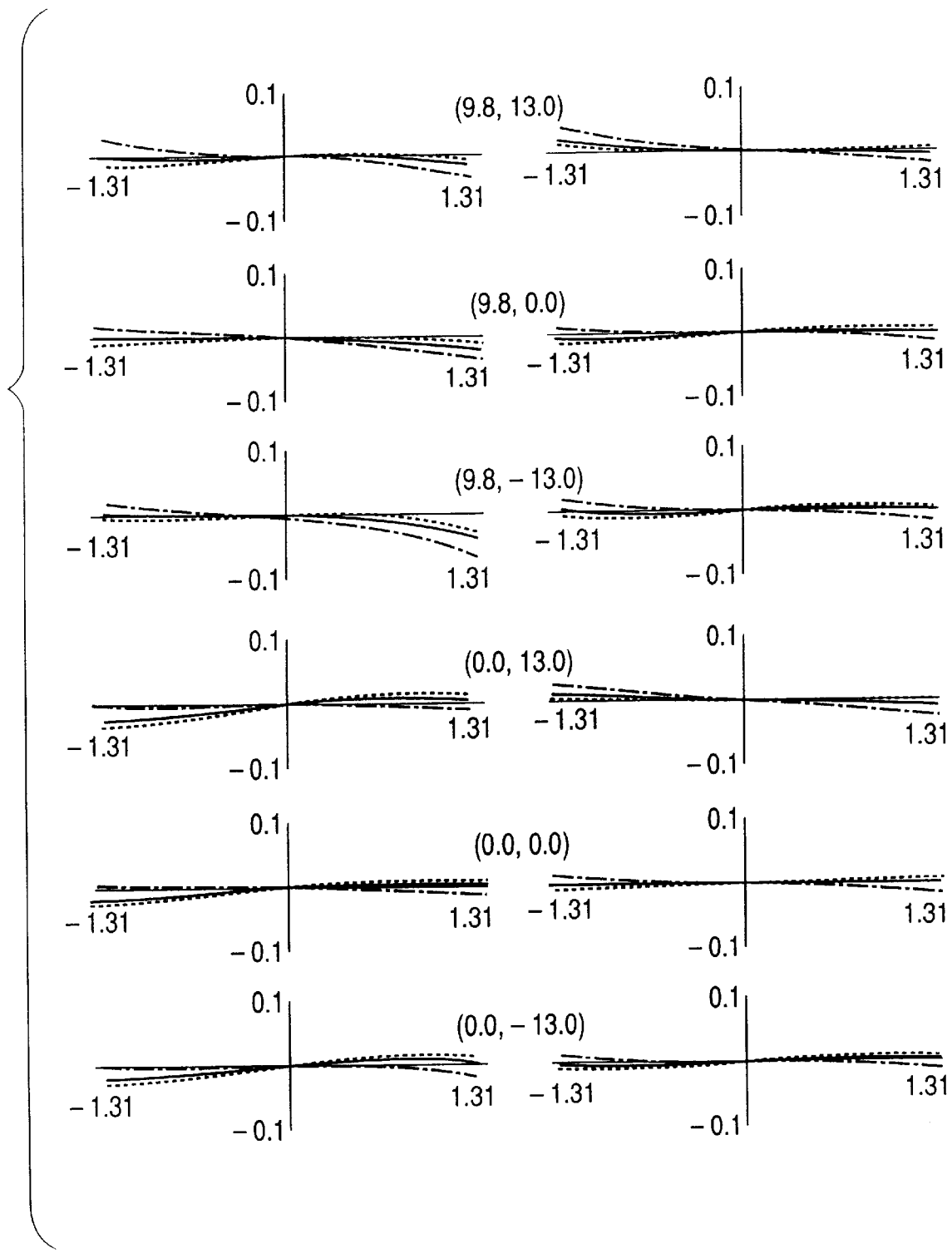
FIG. 15 shows aberration charts at the intermediate focal length of the finder system according to the fourth embodiment.
Figure 16:
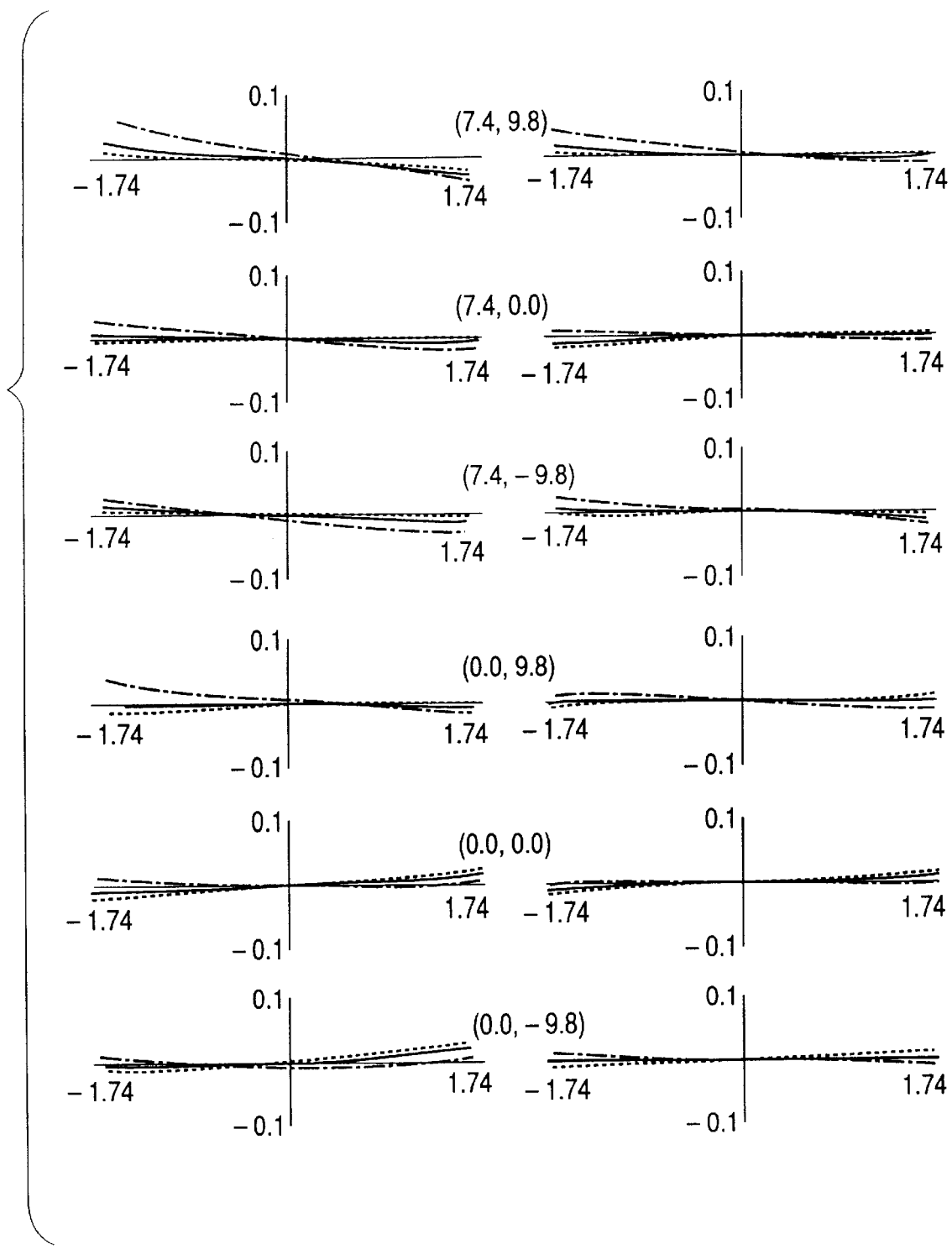
FIG. 16 shows aberration charts in the maximum telephoto state of the finder system according to the fourth embodiment.

FIGS. 14 to 16 show aberration charts of the finder system of the fourth embodiment. FIG. 14 shows aberration charts in the maximum wide-angle state, FIG. 15 shows those at the intermediate focal length, and FIG. 16 shows those in the maximum telephoto state.

Numerical data of this embodiment are as follows.

[Fourth Embodiment]

| Pupil Diameter | φ4.0 | | |
|---|---|---|---|
| Design Distance | 2 m | | |
| Observation Diopter | −1 dpt | | |

| | Wide Angle End | Intermediate focal length | Telephoto end |
|---|---|---|---|
| Finder Magnification | −0.43 | −0.64 | −0.85 |
| Horizontal half field Angle | 19.1 | 13.0 | 9.8 |
| Vertical half field Angle | 14.5 | 9.8 | 7.4 |

| i | Yi | Zi(W) | θi | Di | Ndi | νdi | |
|---|---|---|---|---|---|---|---|
| 1 | 0.00 | 0.00 | 0.00 | 6.85 | 1.49171 | 57.40 | Refraction surface |
| 2 | 0.00 | 6.85 | 0.00 | 6.00 | 1 | | Refraction Surface |
| 3 | 0.00 | 12.85 | 0.00 | 1.50 | 1.49171 | 57.40 | Refraction Surface |
| 4 | 0.00 | 14.35 | 0.00 | 4.52 | 1 | | Refraction Surface |
| 5 | 0.00 | 18.86 | 0.00 | 0.50 | 1.49171 | 57.40 | Refraction Surface |
| 6 | 0.00 | 19.36 | 0.00 | Variable | 1 | | Refraction Surface |
| 7 | 0.00 | 37.35 | 0.00 | 8.00 | 1.58310 | 30.20 | Refraction Surface |
| 8 | 0.00 | 45.35 | 25.00 | 10.00 | 1.58310 | 30.20 | Reflection Surface |
| 9 | −7.66 | 38.92 | 25.00 | 8.00 | 1.58310 | 30.20 | Reflection Surface |
| 10 | −7.66 | 46.92 | 0.00 | Variable | 1 | | Refraction Surface |
| 11 | −7.66 | 47.97 | 0.00 | 8.00 | 1.49171 | 57.40 | Refraction Surface |

-continued

| | | | | | | |
|---|---|---|---|---|---|---|
| 12 | −7.66 | 55.97 | −25.00 | 10.00 | 1.49171 | 57.40 | Reflection Surface |
| 13 | 0.00 | 49.54 | −25.00 | 8.00 | 1.49171 | 57.40 | Reflection Surface |
| 14 | 0.00 | 57.54 | 0.00 | Variable | 1 | | Refraction Surface |
| 15 | 0.00 | 61.12 | 0.00 | 23.04 | 1 | | Refraction Surface |
| 16 | 0.00 | 84.16 | 0.00 | 7.00 | 1.49171 | 57.40 | Refraction Surface |
| 17 | 0.00 | 91.16 | 0.00 | 30.00 | 1 | | Refraction Surface |
| 18 | 0.00 | 121.16 | 0.00 | 0.00 | 1 | | Eye Point |

| | Wide Angle End | Intermediate focal length | Telephoto end |
|---|---|---|---|
| D6 | 17.98 | 9.09 | 6.15 |
| D10 | 1.04 | 3.40 | 1.00 |
| D14 | 3.59 | 10.13 | 15.47 |

| | | |
|---|---|---|
| D1 to 6 Surface | $Z_i(M) = Z_i(W) - 0.00$ | $Z_i(T) = Z_i(W) - 0.00$ |
| D7 to 10 Surface | $Z_i(M) = Z_i(W) - 8.90$ | $Z_i(T) = Z_i(W) - 11.84$ |
| D11 to 14 Surface | $Z_i(M) = Z_i(W) - 6.54$ | $Z_i(T) = Z_i(W) - 11.88$ |

Spherical Configuration

| | |
|---|---|
| R1 Surface | r1 = 17.611 |
| R4 Surface | r4 = 15.000 |
| R5 Surface | r5 = ∞ |
| R6 Surface | r6 = ∞ |
| R7 Surface | r7 = −205.762 |
| R11 Surface | r11 = −19.790 |
| R14 Surface | r14 = −17.877 |
| R16 Surface | r16 = 26.564 |

Aspherical Configuration

| | |
|---|---|
| R2 Surface | r2 = −10.000 |
| | k = −1.185 |
| | a = 9.90007e−05 |
| | b = 0.00000e+00 |
| R3 Surface | r3 = 10.981 |
| | k = −1.127 |
| | a = 7.45300e−05 |
| | b = 0.00000e+00 |
| R10 Surface | r10 = 11.789 |
| | k = −0.331 |
| | a = −1.50393e−05 |
| | b = 0.00000e+00 |
| R17 Surface | r17 = −15.409 |
| | k = −0.983 |
| | a = 2.95274e−05 |
| | b = 0.00000e+00 |

Free Curved Surface Configuration

| | | | |
|---|---|---|---|
| R8 Surface | C02 = 1.40625e−03 | C20 = 3.05192e−03 | |
| | C03 = 1.75915e−04 | C21 = 1.27506e−04 | |
| | C04 = 1.30290e−05 | C22 = 1.57447e−05 | C40 = 1.52362e−05 |
| R9 Surface | C02 = 1.08972e−02 | C20 = 1.39559e−02 | |
| | C03 = 9.75587e−05 | C21 = 8.16204e−05 | |
| | C04 = 2.21458e−06 | C22 = 1.77884e−06 | C40 = 4.14111e−06 |
| R12 Surface | C02 = −1.29915e−02 | C20 = −1.62511e−02 | |
| | C03 = −3.58037e−05 | C21 = −5.51220e−05 | |
| | C04 = −3.69417e−06 | C22 = −1.03872e−05 | C40 = −5.17807e−06 |
| R13 Surface | C02 = −6.26017e−03 | C20 = −8.75765e−03 | |
| | C03 = −1.70158e−04 | C21 = −1.94241e−04 | |
| | C04 = −8.44726e−06 | C22 = −2.08647e−05 | C40 = −9.17807e−06 |

As described above, when the components of each lens system in a finder system are appropriately set, a finder system suitable for a still camera, a video camera, or a digital camera, which can achieve at least one of

- a decrease in the number of lens components of the entire lens system,
- satisfactory correction of a variation in aberrations, and more particularly, chromatic aberration as the focal length changes, and
- improvement of the degree of freedom in finder layout, and an image sensing apparatus using the finder system can be implemented.

Especially, according to this embodiment, in a real-image finder the function of forming an image of light beam from an object, the function of erecting the formed object image, and the function of observing the erect object image, at least one optical element is provided, which is made by integrally molding, on the surface of a transparent body, a refracting surface on which the light beam becomes incident, a plurality of reflecting surfaces each having a curvature, and a refracting surface from which the light beam reflected by the plurality of reflecting surfaces emerges. The optical element has the function of erecting the formed object image and moves to change the observation magnification of the real-image finder whereby the following effects are obtained.

An optical element having reflecting surfaces each having a curvature is arranged in a finder system constructed by an objective optical system, an erecting optical system, a field frame, and an eyepiece lens system, thereby decreasing the number of components in the finder system.

When an optical element made by integrally molding, on the surface of a transparent body, a refracting surface on which a light beam becomes incident, a plurality of reflecting surfaces each having a curvature, and a refracting surface from which the light beam reflected by the plurality of reflecting surfaces emerges is arranged in the finder, aberrations can be satisfactorily corrected.

When an optical element having reflecting surfaces each having a curvature is used to allow free selection of the incident and exit optical axis directions, the degree of freedom in finder layout can be improved.

An image sensing apparatus according to still another embodiment, which has one of the finder optical systems of the first to fourth embodiments, will be described with reference to FIGS. 17A and 17B.

Figure 17A:
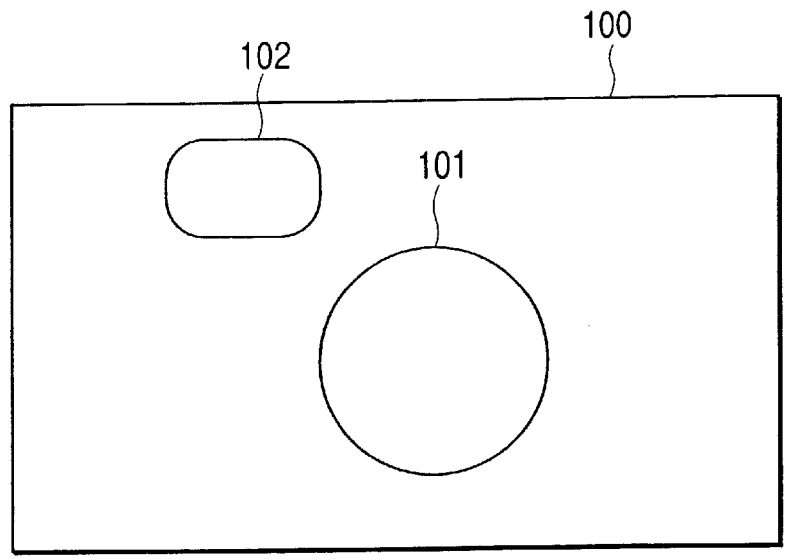
FIGS. 17A and 17B are views showing the schematic arrangement of an image sensing apparatus having one of the finder systems of the first to fourth embodiments.
Figure 17B:
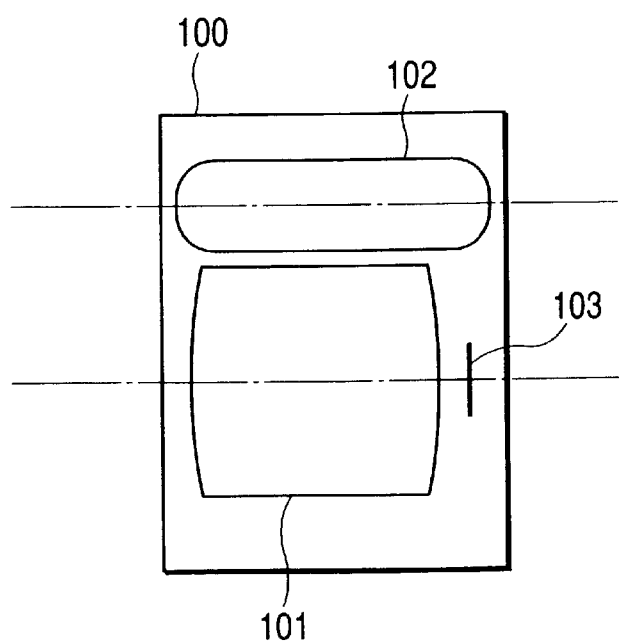

FIG. 17A is a front view of the image sensing apparatus, and FIG. 17B is a sectional view of the side portion thereof. Referring to FIGS. 17A and 17B, the image sensing apparatus comprises an image sensing apparatus main body (case) 100, an image sensing optical system 101 formed from a zoom lens, a finder system 102 according to one of the first to fourth embodiments, and an image sensing element 103 such as a CCD.

When one of the finder systems according to the first to fourth embodiments is applied to an image sensing apparatus, a compact image sensing apparatus can be implemented.

What is claimed is:

1. An observation optical system comprising:
an objective optical system for forming an inverted image of an object;
an erecting optical system for converting the inverted image into an erected image; and
an eyepiece optical system for guiding the erected image to an observer,
wherein at least one of said objective optical system, said erecting optical system, and said eyepiece optical system has a first optical element having a curved reflecting surface and changes an observation magnification by moving said first optical element and an optical unit of one of said objective optical system, said erecting optical system, and said eyepiece optical system.

2. A system according to claim 1, wherein said first optical element comprises a transparent body having two refracting surfaces and the curved reflecting surface.

3. A system according to claim 1, wherein the curved reflecting surface of said first optical element comprises a rotationally asymmetric aspherical surface.

4. A system according to claim 1, wherein said objective optical system has said first optical element.

5. A system according to claim 1, wherein said objective optical system has said first optical element and said optical unit.

6. A system according to claim 5, wherein said optical unit comprises a lens unit.

7. A system according to claim 1, wherein said objective optical system has said first optical element, and said erecting optical system has said optical unit.

8. A system according to claim 7, wherein said optical unit comprises a second optical element having a curved reflecting surface.

9. A system according to claim 8, wherein said erecting optical system re-forms the inverted image formed by said objective optical system to convert the inverted image into the erected image.

10. A system according to claim 7, wherein said first optical element of said objective optical system forms the inverted image in said element.

11. A system according to claim 1, wherein said erecting optical system has said first optical element.

12. A system according to claim 1, wherein said objective optical system has said optical unit, and said erecting optical system has said first optical element.

13. A system according to claim 12, wherein said optical unit comprises a lens unit.

14. A system according to claim 1, wherein said erecting optical system has said first optical element and a second optical element having a curved reflecting surface.

15. A system according to claim 14, wherein said erecting optical system re-forms the inverted image formed by said objective optical system to convert the inverted image into the erected image.

16. A system according to claim 1, wherein said optical unit comprises a second optical element having a curved reflecting surface.

17. An optical apparatus comprising said observation optical system of claim 1.

18. An apparatus according to claim 17, further comprising an image sensing optical system for forming an image of an object on a photosensitive surface.

19. A variable magnification observation optical system comprising:
an objective optical system for forming an inverted image of an object;
an erecting optical system for converting the inverted image into an erected image; and
an eyepiece optical system for guiding the erected image to an observer,
wherein said objective optical system comprises an optical element having at least one curved reflecting surface, and
wherein said erecting optical system comprises an optical element having at least one curved reflecting surface, and
wherein said optical element of said objective optical system moves during change of observation magnification.

* * * * *

UNITED STATES PATENT AND TRADEMARK OFFICE
CERTIFICATE OF CORRECTION

PATENT NO. : 6,529,330 B1
DATED : March 4, 2003
INVENTOR(S) : Makoto Sekita et al.

It is certified that error appears in the above-identified patent and that said Letters Patent is hereby corrected as shown below:

Column 2,
Line 13, "system." should read -- system, --.

Column 4,
Line 46, "described," should read -- described. --.

Column 6,
Line 17, "$C_{30}X^3$" should read -- $C_{30}x^3$ --.

Column 7,
Line 60, "Ii" should read -- I1 --.

Column 12,
Line 25, "element 12" should read -- element 12b --.

Column 21,
Line 60, "elements 13" should read -- elements 13d --.

Column 22,
Line 23, "a direction," should read -- direction, --.
Line 67, "surface t4" should read -- surface r14 --.

Column 23,
Line 2, "r2" should read -- r12 --.

UNITED STATES PATENT AND TRADEMARK OFFICE
CERTIFICATE OF CORRECTION

PATENT NO.    : 6,529,330 B1
DATED         : March 4, 2003
INVENTOR(S)   : Makoto Sekita et al.

It is certified that error appears in the above-identified patent and that said Letters Patent is hereby corrected as shown below:

Column 24,
Line 18, "system 2." should read -- system 2, --.

Signed and Sealed this

Thirtieth Day of September, 2003

JAMES E. ROGAN
*Director of the United States Patent and Trademark Office*